United States Patent
Takahashi et al.

(10) Patent No.: US 8,651,955 B2
(45) Date of Patent: Feb. 18, 2014

(54) GAME DEVICE, CONTROL METHOD, AND COMPUTER PROGRAM PRODUCT

(75) Inventors: Tsuyoshi Takahashi, Tokyo (JP); Ken Matsumoto, Tokyo (JP); Kunihiko Mori, Yokohama (JP)

(73) Assignee: Namco Bandai Games Inc., Tokyo (JP)

( * ) Notice: Subject to any disclaimer, the term of this patent is extended or adjusted under 35 U.S.C. 154(b) by 710 days.

(21) Appl. No.: 12/862,017

(22) Filed: Aug. 24, 2010

(65) Prior Publication Data

US 2011/0053686 A1 Mar. 3, 2011

(30) Foreign Application Priority Data

Aug. 26, 2009 (JP) .................................. 2009-196023

(51) Int. Cl.
*A63F 13/00* (2006.01)

(52) U.S. Cl.
USPC ..................... 463/42; 463/24; 463/29; 463/43

(58) Field of Classification Search
USPC .......................................... 463/24, 29, 42, 43
See application file for complete search history.

(56) References Cited

U.S. PATENT DOCUMENTS

| | | | |
|---|---|---|---|
| 6,804,535 B2 * | 10/2004 | Takahashi ...................... | 455/557 |
| 2007/0008884 A1 * | 1/2007 | Tang ............................ | 370/230 |
| 2008/0009243 A1 * | 1/2008 | Hart ............................ | 455/67.13 |
| 2008/0126568 A1 | 5/2008 | Otoshi et al. | |

FOREIGN PATENT DOCUMENTS

| | | |
|---|---|---|
| EP | 1 595 585 A2 | 11/2005 |
| EP | 2 158 952 A2 | 3/2010 |
| JP | A-2004-230191 | 8/2004 |

OTHER PUBLICATIONS

Baughman et al., "Cheat-Proof Playout for Centralized and Distributed Online Games," IEEE Infocom, vol. 1, Apr. 22, 2001, pp. 104-113.
Rooney et al., "A Federated Peer-to-Peer Network Game Architecture," IEEE Communications Magazine, May 2004.
European Search Report dated Nov. 4, 2010 in European Patent Application No. 10174112.2.

* cited by examiner

*Primary Examiner* — James S McClellan
(74) *Attorney, Agent, or Firm* — Oliff PLC

(57) ABSTRACT

A game device includes a packet processing section that processes a packet that is transferred between the game device and another game device via a network, a game calculation section that performs a game calculation process based on data transferred using a packet, and an image generation section that generates an image based on a result of the game calculation process. The game calculation section performs a game sequence process as the game calculation process in each game sequence interval. A packet that is transferred between the game device and the other game device includes a packet ID that specifies the type of data transferred using the packet, and an interval ID that specifies the game sequence interval that utilizes data transferred using the packet. The packet processing section compares the interval ID included in a received packet with the interval ID of a current game sequence interval. The game calculation section performs the game calculation process based on data included in a packet when the interval ID included in the packet coincides with the interval ID of the current game sequence interval.

20 Claims, 17 Drawing Sheets

FIG. 4A
```
BATTLE LOBBY
TARO            JP    RANK    652      251       115
TANAKA                  7     WINS    DEFEATS   DRAWS
   LILI         US    RANK    325      115        65
                        5     WINS    DEFEATS   DRAWS
KENTA           JP    RANK    415       95        42
                        6     WINS    DEFEATS   DRAWS
            SELECT OPPOSING PLAYER.
```
FIG. 4B
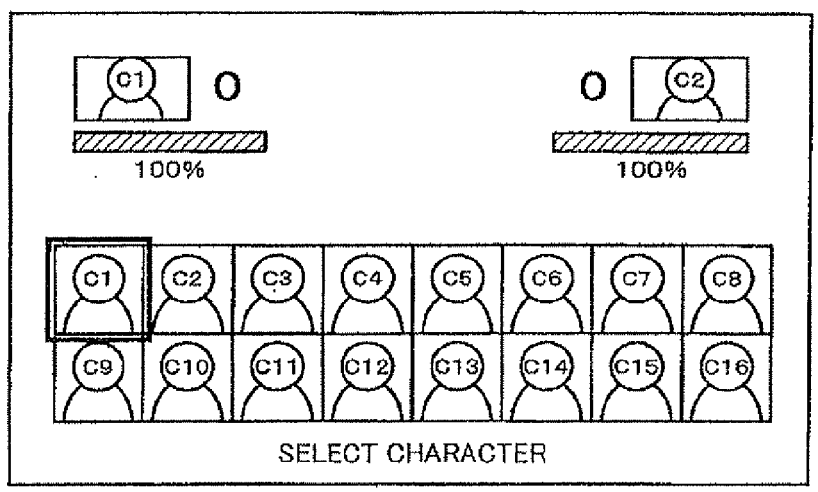
FIG. 4C
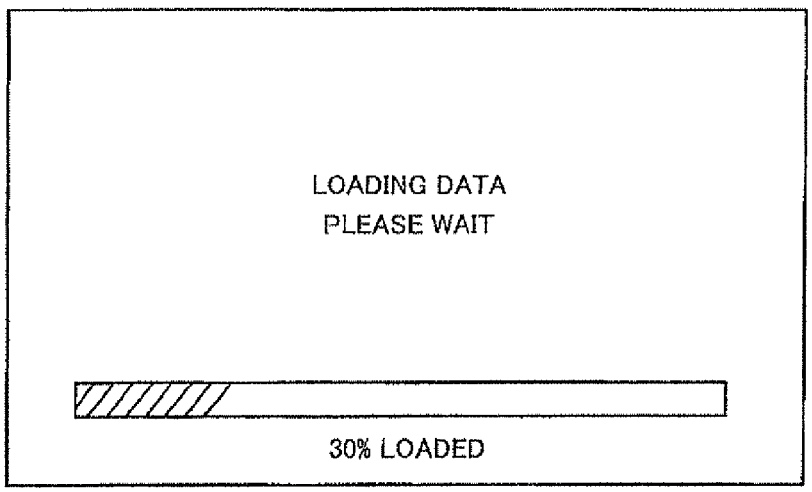

FIG. 7A  TCP
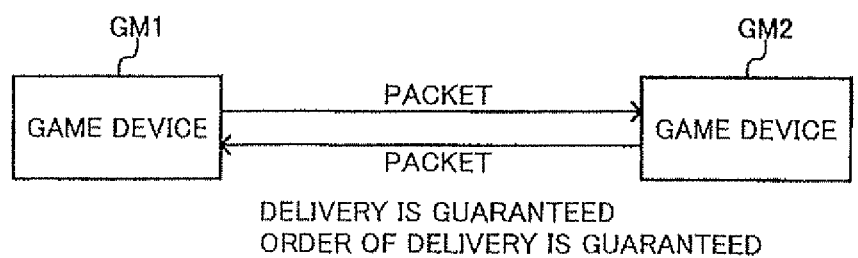
FIG. 7B  UDP
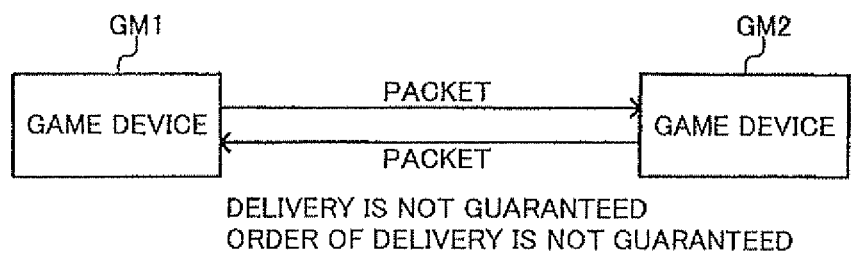

FIG. 12A  INTERVAL ID OF CURRENT GAME SEQUENCE INTERVAL=3
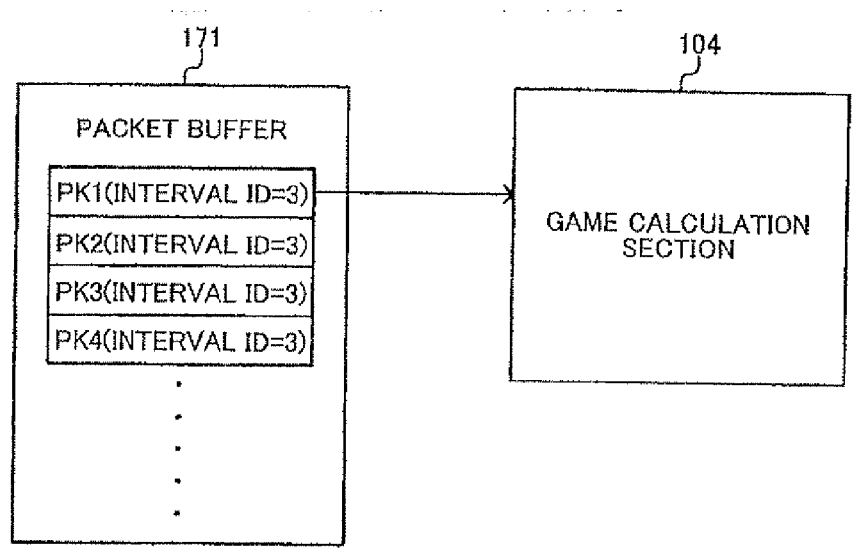
FIG. 12B  INTERVAL ID OF CURRENT GAME SEQUENCE INTERVAL=4
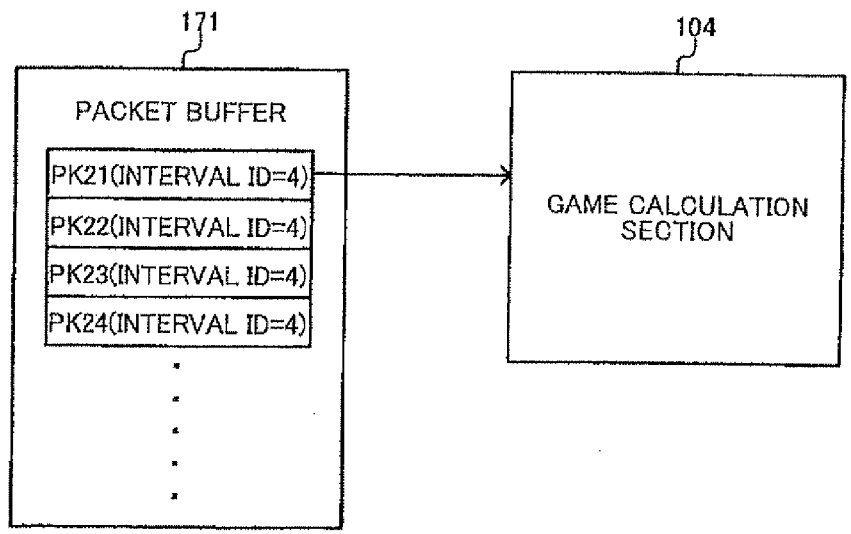

GAME DEVICE, CONTROL METHOD, AND COMPUTER PROGRAM PRODUCT

Japanese Patent Application No. 2009-196023 filed on Aug. 26, 2009, is hereby incorporated by reference in its entirety.

BACKGROUND

The present invention relates to a game device, a control method, a computer program product, and the like.

In recent years, a game device that implements an online battle game with another game device that is connected thereto via a network has attracted attention. JP-A-2004-230191 discloses related-art online battle game technology, for example.

The online battle game requires that game data (e.g., operation data) be exchanged between the game devices. For example, operation data (key data) input by the opposing player is received from another game device via the network, or operation data input by the player using his game device is transmitted to another game device via the network. This makes it possible to implement an online battle game between the player and the opposing player.

It is desirable to transfer the game data (e.g., operation data) at a high transfer rate in order to implement a smooth online battle game. The User Datagram Protocol (UDP) and the like have been known as a communication protocol that implements a high transfer rate.

However, a high-speed communication protocol such as UDP does not guarantee delivery and the order of delivery of packets, differing from a communication protocol (e.g., Transmission Control Protocol (TCP)) that attaches importance to reliability. Therefore, the process of the game program may become complex, or the storage capacity of the buffer may be wasted, for example.

SUMMARY

According to one aspect of the invention, there is provided a game device comprising:

a packet processing section that processes a packet that is transferred between the game device and another game device via a network;

a game calculation section that performs a game calculation process based on data transferred by the packet; and an image generation section that generates an image based on a result of the game calculation process, the game calculation section performing a game sequence process as the game calculation process in each of a plurality of game sequence intervals, the packet transferred between the game device and the other game device including an interval ID that specifies a game sequence interval in which data transferred by the packet is used, the packet processing section comparing the interval ID included in the received packet with the interval ID of a current game sequence interval, and the game calculation section performing the game calculation process based on data included in the packet when the interval ID included in the packet coincides with the interval ID of the current game sequence interval.

According to another aspect of the invention, there is provided a method of controlling a game device comprising:

processing a packet that is transferred between the game device and another game device via a network;

performing a game calculation process based on data transferred by the packet, the game calculation process performing a game sequence process in each of a plurality of game sequence intervals; and generating an image based on a result of the game calculation process, the packet transferred between the game device and the other game device including an interval ID that specifies a game sequence interval in which data transferred by the packet is used, the method further comprising:

comparing the interval ID included in the received packet with the interval ID of a current game sequence interval; and performing the game calculation process based on data included in the packet when the interval ID included in the packet coincides with the interval ID of the current game sequence interval.

According to another aspect of the invention, there is provided a computer program product storing a program code that causes a computer to execute the above method.

BRIEF DESCRIPTION OF THE DRAWINGS

FIGS. 4A to 4C are views illustrative of a game sequence process.

FIGS. 7A and 7B are views illustrative of a packet transfer using TCP or UDP.

FIGS. 12A and 12B are views illustrative of a packet process according to one embodiment of the invention that uses an interval ID.

DESCRIPTION OF EXEMPLARY EMBODIMENTS

Figure 1A:
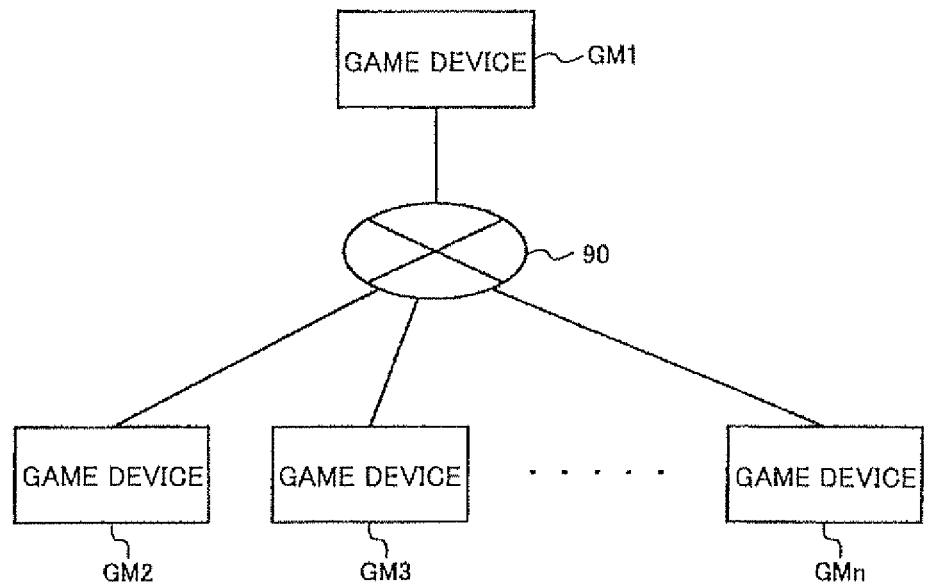
FIGS. 1A and 1B show examples of the network configuration of a game device.

Several aspects of the invention may provide a game device, a control method, a computer program product, and the like that can prevent a problem in which a game calculation process becomes complex, or the storage capacity is wasted.

According to one embodiment of the invention, there is provided a game device comprising:

a packet processing section that processes a packet that is transferred between the game device and another game device via a network;

a game calculation section that performs a game calculation process based on data transferred by the packet; and an image generation section that generates an image based on a result of the game calculation process, the game calculation section performing a game sequence process as the game calculation process in each of a plurality of game sequence intervals, the packet transferred between the game device and the other game device including an interval ID that specifies a game sequence interval in which data transferred by the packet is used, the packet processing section comparing the interval ID included in the received packet with the interval ID of a current game sequence interval, and the game calculation section performing the game calculation process based on data included in the packet when the interval ID included in the packet coincides with the interval ID of the current game sequence interval.

According to this embodiment, the packet transferred via the network includes the packet ID and the interval ID, and the interval ID included in the packet received from the other game device is compared with the interval ID of the current game sequence interval. The game calculation process is performed based on data included in the packet when the interval ID included in the packet coincides with the interval ID of the current game sequence interval. For example, the game sequence process is performed in each game sequence interval. According to this configuration, since the game calculation process is performed based on data included in the packet on condition that the interval ID included in the packet coincides with the interval ID of the current game sequence interval, a problem in which the game calculation process becomes complex, or the storage capacity is wasted can be prevented.

The game device may further comprise a packet buffer that stores the packet received from the other game device, the packet processing section may write the packet into the packet buffer when the interval ID included in the packet coincides with the interval ID of the current game sequence interval, and the game calculation section may perform the game calculation process based on data included in the packet that has been written into the packet buffer.

According to this configuration, the packet is written into the packet buffer when the interval ID included in the packet coincides with the interval ID of the current game sequence interval, and the game calculation process is performed based on data included in the packet that has been written into the packet buffer. This makes it possible to simplify the game calculation process while improving the process efficiency, and save the storage capacity of the packet buffer, for example.

In the game device, the packet processing section may discard a packet without writing the packet into the packet buffer when the interval ID included in the packet does not coincide with the interval ID of the current game sequence interval.

According to this configuration, the packet is not written into the packet buffer when the interval ID included in the packet does not coincide with the interval ID of the current game sequence interval. This makes it possible to prevent a situation in which the storage capacity is wasted due to the packet that remains in the packet buffer, or the game calculation process becomes complex.

In the game device, the packet processing section may perform an interval synchronization process that synchronizes the game sequence interval of the game device with the game sequence interval of the other game device, and the game calculation section may cause a transition from an (N−1)th game sequence interval to an Nth game sequence interval to occur when the interval synchronization process has been completed.

This makes it possible to synchronize the game sequence interval of the game device and the game sequence interval of the other game device, and properly compare the interval ID included in the packet with the interval ID of the game sequence interval.

In the game device, the packet processing section may generate the packet that includes the interval ID that indicates the Nth game sequence interval in the Nth game sequence interval, and may transmit the generated packet to the other game device.

According to this configuration, since only the packet that includes the interval ID that indicates the Nth game sequence interval can be transmitted to the other game device in the Nth game sequence interval, the packet process and the game calculation process can be simplified while improving the process efficiency.

In the game device, the packet processing section may perform an update process that increments or decrements the interval ID when the transition from the (N−1)th game sequence interval to the Nth game sequence interval has occurred.

This makes it possible to uniquely link the game sequence interval to the interval ID, so that the process can be simplified while improving the process efficiency.

In the game device, the packet processing section may perform the interval synchronization process by transferring a synchronization packet between the game device and the other game device.

This makes it possible to implement the interval synchronization process by merely transferring the synchronization packet.

In the game device, the packet processing section may transmit a synchronization packet that notifies the transition to the Nth game sequence interval to the other game device when the game device has completed the (N−1)th game sequence interval and received a synchronization packet that requests the interval synchronization process from the other game device.

This makes it possible to implement the interval synchronization process by simply transferring the synchronization packet between the game device and the other game device, The game device may further comprise a network management section that performs a network management process, and the network management section may determine that the network has been disconnected when the interval synchronization process has not been completed within a given period.

This makes it possible to sequentially cause a transition in the game sequence interval to occur while determining whether or not the network that connects the game device and the other game device has been disconnected each time the interval synchronization process is performed.

In the game device, the packet processing section may manage the interval ID, and may notify the other game device that is a client of a transition of the game sequence interval when the game device is a host.

This makes it possible for the host game device to take the initiative in the interval ID management process and the game sequence interval synchronization process.

In the game device, the game calculation section may perform at least one of a character selection process that selects a character that appears in a game, a data load process that loads data necessary for the game, a character battle process, and a game result display process as the game sequence process performed in each of the plurality of game sequence intervals.

Note that the game sequence process performed in each game sequence interval is not limited to the character selection process, the data load process, the character battle process, and the game result display process.

According to another embodiment of the invention, there is provided a method of controlling a game device comprising:

processing a packet that is transferred between the game device and another game device via a network;

performing a game calculation process based on data transferred by the packet, the game calculation process performing a game sequence process in each of a plurality of game sequence intervals; and generating an image based on a result of the game calculation process, the packet transferred between the game device and the other game device including an interval ID that specifies a game sequence interval in which data transferred by the packet is used, the method further comprising:

comparing the interval ID included in the received packet with the interval ID of a current game sequence interval; and performing the game calculation process based on data included in the packet when the interval ID included in the packet coincides with the interval ID of the current game sequence interval.

According to another embodiment of the invention, there is provided a computer program product storing a program code that causes a computer to execute the above method.

The term "computer program product" refers to an information storage medium, a device, an instrument, a system, and the like that stores a program code, such as an information storage medium (e.g., optical disk medium (e.g., DVD), hard disk medium, and memory medium) that stores a program code, a computer that stores a program code, or an Internet system (e.g., a system including a server and a client terminal), for example. In this case, each element and each process according to the above embodiments are implemented by corresponding modules, and a program code that includes these modules is recorded in the computer program product.

Embodiments of the invention are described below. Note that the following embodiments do not in any way limit the scope of the invention laid out in the claims. Note also that all elements of the following embodiments should not necessarily be taken as essential requirements for the invention.

1. Network Configuration

Figure 1B:
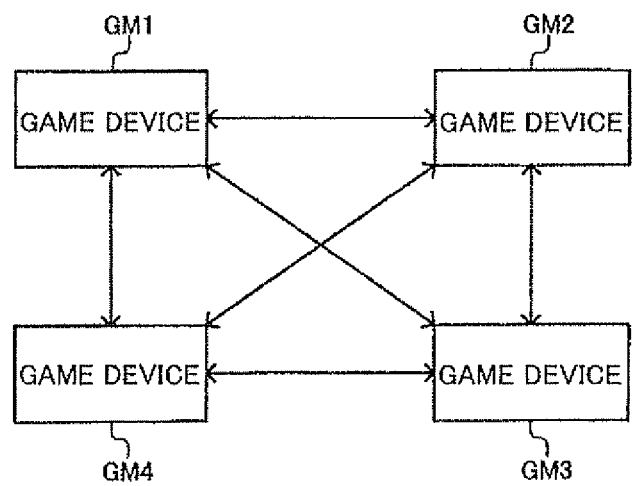

FIGS. 1A and 1B show network configuration examples when implementing an online game using a game device according to one embodiment of the invention. FIG. 1A shows an example of a tree network configuration, and FIG. 1B shows an example of a full-mesh (mesh) network configuration.

In the tree network configuration shown in FIG. 1A, game devices GM2, GM3, . . . , and GMn (clients) are connected to a game device GM1 (host) via a network 90. The network 90 (distribution network or communication line) is a communication channel that utilizes the Internet, a wireless LAN, and the like. The network 90 may include a communication network such as a LAN that utilizes a private line (private cable) for direct connection, Ethernet (registered trademark), and the like, a telecommunication network, a cable network, and a wireless LAN. The communication method may be either a cable communication method or a wireless communication method.

In the full-mesh network configuration shown in FIG. 1B, each of the game devices GM1, GM2, GM3, and GM4 is connected to all of the other game devices via a network (e.g., wireless LAN).

Note that the network configuration of the game device according to this embodiment is not limited to those shown in FIGS. 1A and 1B. Various other network configurations such as a ring network configuration, a bus network configuration, and a hybrid network configuration may also be employed.

Figure 2A:
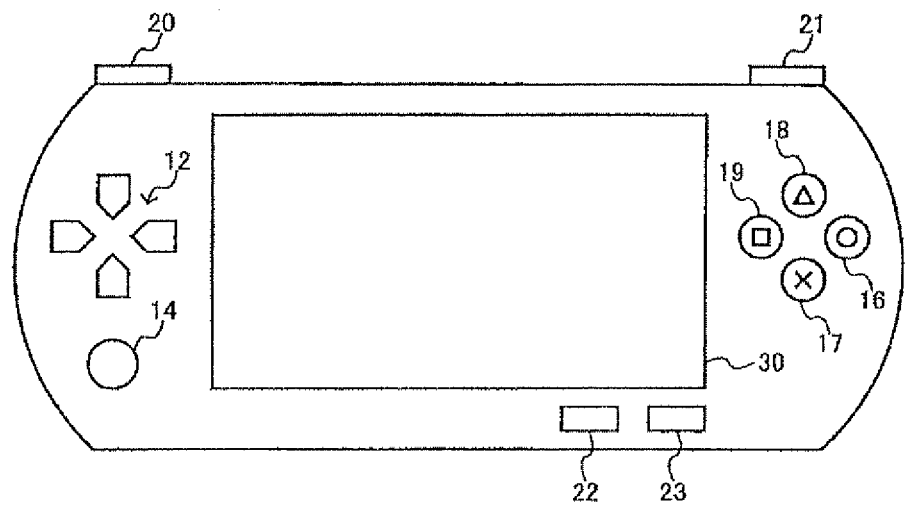
FIGS. 2A and 2B show an application example of a portable game device.

FIG. 2A shows an application example of a portable game device. The portable game device includes operation sections such as a direction key 12, an analog stick 14, operation buttons 16 to 19, an L button 20, an R button 21, a select button 22, and a start button 23. The portable game device also includes a display 30 (display section in a broad sense) and a speaker (sound output section in a broad sense) (not shown).

The portable game device shown in FIG. 2A can implement wireless communication via a wireless LAN (wireless network in a broad sense). A wireless LAN for a portable game device may utilize an ad hoc mode or an infrastructure mode. The ad hoc mode refers to a mode in which the portable game devices communicate with each other. Each portable game device automatically searches the same channel as that of the opposing portable game device, and implements an online battle, and the like. The infrastructure mode refers to a mode in which the portable game device is connected to the Internet.

Figure 2B:
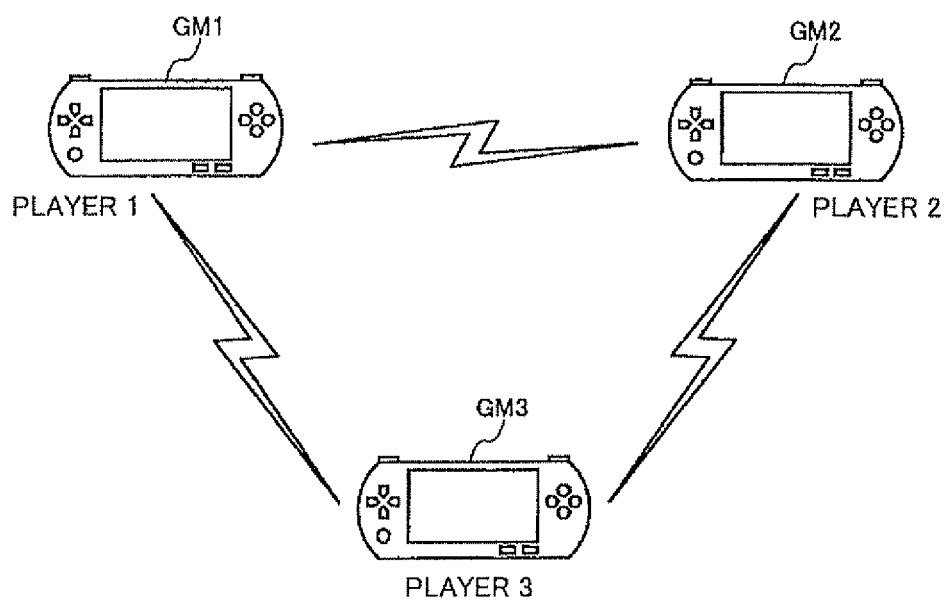

In FIG. 2B, the portable game devices GM1 to GM3 are connected via a wireless LAN (wireless network), and players 1 to 3 of the portable game devices GM1 to GM3 enjoy an online battle game, and the like.

2. Configuration of Game Device

Figure 3:
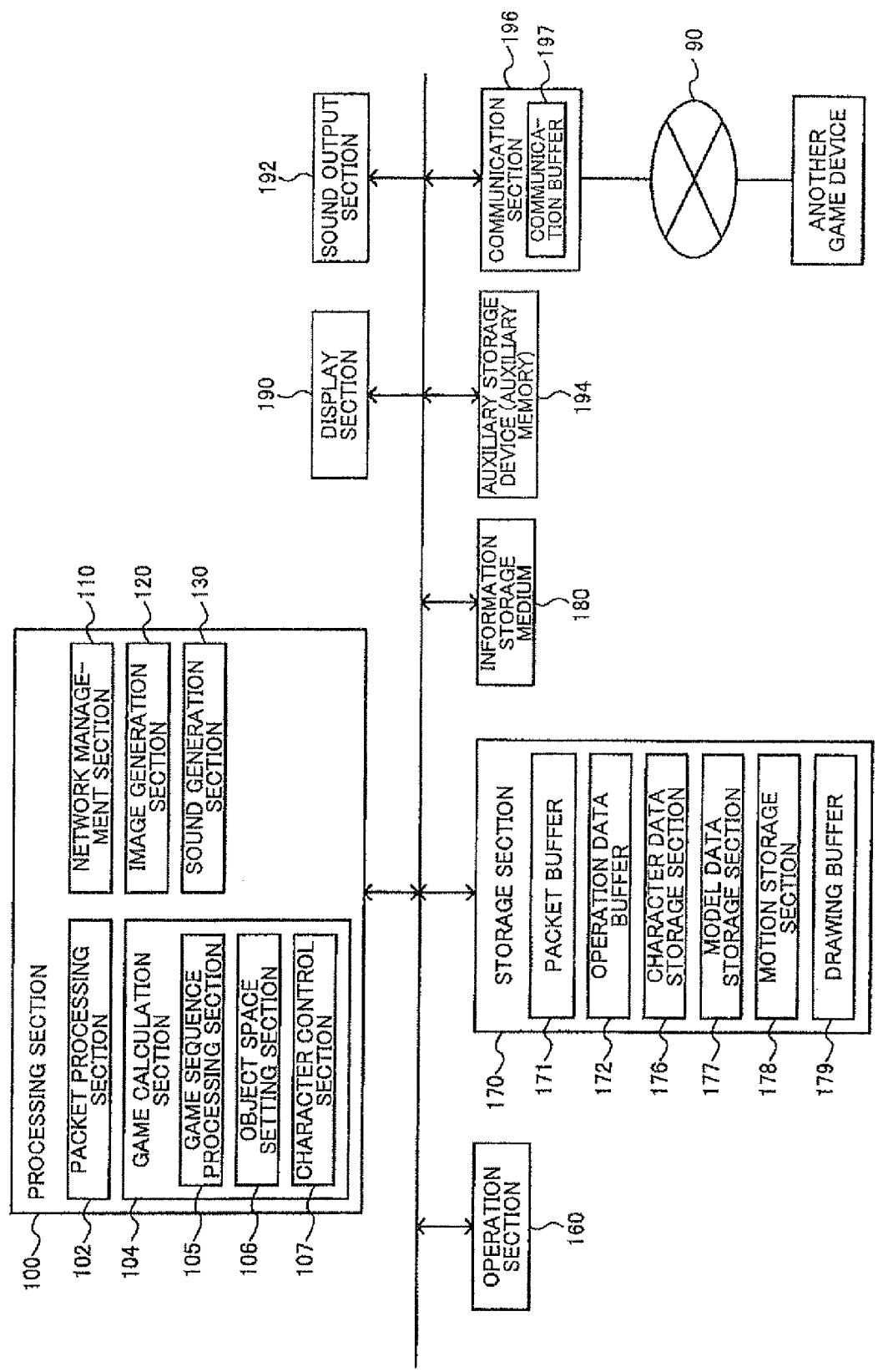
FIG. 3 shows a configuration example of a game device according to one embodiment of the invention.

FIG. 3 shows a configuration example of the game device (image generation system or game system) according to this embodiment. Note that the game device according to this embodiment is not limited to the configuration shown in FIG. 3. Various modifications may be made, such as omitting some of the elements or adding other elements.

An operation section 160 allows the player to input operation data. The function of the operation section 160 may be implemented by a direction key, an operation button, an analog stick, a lever, a sensor (e.g., angular velocity sensor or acceleration sensor), a microphone, a touch panel display, and the like.

A storage section 170 serves as a work area for a processing section 100. The function of the storage section 170 may be implemented by a RAM (DRAM or VRAM) and the like. A game program and game data are stored in the storage section 170.

Note that the term "game program" refers to software that includes an instruction code for executing a game process. The term "game data" refers to data that is necessary when executing the game program. Examples of the game data include operation data, character data, game stage data, information about a member who participates in communication, position data about a character, and the like.

An information storage medium 180 (computer-readable medium) stores a program, data, and the like. The function of the information storage medium 180 may be implemented by an optical disk (CD or DVD), a hard disk drive (HDD), a memory (e.g., ROM), and the like. The processing section 100 performs various processes according to this embodiment based on a program (data) stored in the information storage medium 180. Specifically, a program that causes a computer (i.e., a device that includes an operation section, a processing section, a storage section, and an output section) to function as each section according to this embodiment (i.e., a program that causes a computer to execute the process of each section) is stored in the information storage medium 180.

A display section 190 outputs an image generated according to this embodiment. The function of the display section 190 may be implemented by an LCD, an organic EL display, a CRT, a touch panel display, a head mount display (HMD), and the like. A sound output section 192 outputs sound generated according to this embodiment. The function of the sound output section 192 may be implemented by a speaker, a headphone, and the like.

An auxiliary storage device 194 (auxiliary memory or secondary memory) is a storage device used to supplement the capacity of the storage section 170. The auxiliary storage device 194 may be implemented by a memory card such as an SD memory card or a multimedia card, and the like.

A communication section 196 communicates with the outside (e.g., another game device or server) via a cable or wireless network. The function of the communication section 196 may be implemented by hardware (e.g., communication ASIC or communication processor) or communication firmware.

A program (data) that causes a computer to function as each section according to this embodiment may be distributed to the information storage medium 180 (or the storage section 170 or the auxiliary storage device 194) from an information storage medium included in a server (host device) via a network and the communication section 196. Use of the information storage medium included in the server (host device) is also included within the scope of the invention.

The processing section 100 (processor) performs a game process, an image generation process, a sound generation process, and the like based on operation data from the operation section 160, a program, and the like. The processing section 100 performs various processes using the storage section 170 as a work area. The function of the processing section 100 may be implemented by hardware such as a processor (e.g., CPU or GPU) or ASIC (e.g., gate array) or a program.

The processing section 100 includes a packet processing section 102, a game calculation section 104, a network management section 110, an image generation section 120, and a sound generation section 130. Note that various modifications may be made, such as omitting some of these elements or adding other elements.

The packet processing section 102 performs various packet processes. For example, the packet processing section 102 processes a packet that is transferred between the game device and another game device via the network 90, Specifically, the packet processing section 102 receives a packet via the communication section 196, and writes the received packet into a packet buffer 171, or generates a packet, and transmits the generated packet via the communication section 196, for example.

The game calculation section 104 performs a game calculation process. For example, the game calculation section 104 performs the game calculation based on data that is transferred using a packet. The game calculation process includes starting the game when game start conditions have been satisfied, proceeding with the game, calculating the game results, and finishing the game when game finish conditions have been satisfied, for example.

The game calculation section 104 includes a game sequence processing section 105, an object space setting section 106, and a character control section 107.

The game sequence processing section 105 performs a process of each of a plurality of game sequences that form the game, and causes a transition of the game sequence to occur.

The object space setting section 106 disposes an object (i.e., an object formed by a primitive surface such as a polygon, a free-form surface, or a subdivision surface) that represents a display object such as a character (model object), a map (topography), a building, a course (road), a tree, or a wall in an object space. Specifically, the object space setting section 106 determines the position and the rotational angle (synonymous with orientation or direction) of the object in a world coordinate system, and disposes the object at the determined position (X, Y, Z) and the determined rotational angle (rotational angles around X, Y, and Z axes).

The character control section 107 controls a character. The term "character" used herein refers to a moving object (e.g., human, robot, animal, car, or fighter aircraft) that appears in the game. Specifically, the character control section 107 performs calculations for moving the character. The character control section 107 also performs calculations for causing the character to make a motion. Specifically, the character control section 107 causes the character to move in the object space or causes the character to make a motion (animation) based on operation data from the operation section 160, a program (movement/motion algorithm), various types of data (motion data), and the like. More specifically, the character control section 107 performs a simulation process that sequentially calculates movement information (position, rotation angle, speed, or acceleration) and motion information (position or rotation angle of a part object) about the character every frame (1/60th of a second). The term "frame" refers to a time unit used when performing the movement/motion process (simulation process) or the image generation process.

For example, the character control section 107 reproduces the motion of the character based on a motion stored in a motion storage section 178. Specifically, the character control section 107 reads motion data including the position or the rotational angle (direction) of each part object (i.e., a bone that forms a skeleton) that forms the character (skeleton) from the motion storage section 178. The character control section 107 reproduces the motion of the character by moving each part object (bone) of the character (i.e., changing the shape of the skeleton).

Note that character data such as character model identification information, motion identification information, attribute information, status information, and item information is stored in a character data storage section 176. Model data (e.g., polygon data) that indicates the shape and the like of the character is stored in a model data storage section 177. Operation data that is obtained when the player has operated the operation section 160 in order to cause the character to make a motion is stored in an operation data buffer 172.

The network management section 110 performs a network management process. For example, the network management section 110 performs a network connection process, a network disconnection determination process, and the like.

The image generation section 120 performs an image generation process based on the results of various processes performed by the processing section 100. For example, the image generation section 120 generates an image based on the results of the game calculation process performed by the game calculation section 104, and outputs the generated image to the display section 190. Specifically, the image generation section 120 performs a geometric process (e.g., coordinate transformation (world coordinate transformation and camera coordinate transformation), clipping, perspective transformation, or light source process), and generates drawing data (e.g., primitive surface vertex position coordinates, texture coordinates, color data, normal vector, or alpha-value) based on the results of the geometric process. The image generation section 120 draws the object (one or more primitive surfaces) subjected to perspective transformation in a drawing buffer 179 (i.e., a buffer (e.g., frame buffer or work buffer) that can store image information corresponding to each pixel) based on the drawing data (primitive surface data). The image generation section 120 thus generates an image viewed from a virtual camera (given viewpoint) in the object space. The drawing process may be implemented by a vertex shader process or a pixel shader process.

The sound generation section 130 performs a sound process based on the results of various processes performed by the processing section 100 to generate game sound (e.g., background music (BGM), effect sound, or voice), and outputs the generated game sound to the sound output section 192.

In this embodiment, the game calculation section 104 performs a game sequence process as the game calculation process in each of a plurality of game sequence intervals.

The game sequence process performed in each game sequence interval includes a character selection process that selects a character that appears in the game, a data load process that loads data necessary for the game, a character battle process, a game result display process, and the like. The game sequence process may further include a lobby process for the player to participate in the online game, an opening screen display process, an ending screen display process, a demonstration screen display process, and the like.

The character selection process includes displaying a character selection screen, receiving a character selection operation performed by the player using the character selection screen, and the like. The data load process includes loading data (e.g., character data and map data) necessary for the game from the storage section 170 or the information storage medium 180 so that the characters can battle against each other. The character battle process includes causing the character operated by the player and a character operated by another player or a computer to battle against each other based on the operation data. The game result display process includes calculating the result of the battle game, and presents the result to the player.

The packet processing section 102 processes a packet that is transferred via the network 90. The packet that is transferred via the network 90 may include a packet ID that specifies the type of data (type of packet) transferred using the packet, and an interval ID that specifies the game sequence interval that utilizes data transferred using the packet. Specifically, the packet processing section 102 receives a packet from another game device, the packet ID, the interval ID, and the like being set in a header field of the packet, and data being set in a data field of the packet. When the game device transmits a packet to another game device, the packet processing section 102 generates a packet, and transmits the generated packet to another game device, the packet ID, the interval ID, and the like being set in the header field of the packet, and data being set in the data field of the packet.

The packet processing section 102 compares the interval ID of the received packet with the interval ID of the current game sequence interval (i.e., the section that corresponds to the game sequence process performed in the current frame). Specifically, the packet processing section 102 determines whether or not the interval ID of the received packet coincides with the interval ID of the current game sequence interval. The game calculation section 104 performs the game calculation process based on the data included in the packet when the interval ID included in the packet coincides with the interval ID of the current game sequence interval. For example, the game calculation section 104 does not perform the game calculation process based on the data included in the packet when the interval ID included in the packet does not coincide with the interval ID of the current game sequence interval.

Specifically, a packet received from another game device is stored in the packet buffer 171. For example, the communication section 196 receives a packet from another game device, and the received packet is written into a communication buffer 197 (socket buffer) of the communication section 196. The packet processing section 102 reads the packet from the communication buffer 197, and writes the packet into the packet buffer 171.

In this embodiment, the packet processing section 102 writes the packet into the packet buffer 171 when the interval ID (synchronization ID) of the packet coincides with the interval ID of the current game sequence interval. Specifically, the packet processing section 102 analyzes the interval ID included in the packet read from the communication buffer 197, and compares the interval ID included in the packet with the interval ID of the current game sequence interval that is set by an interval synchronization process. The packet processing section 102 writes the packet into the packet buffer 171 when the interval ID included in the packet coincides with the interval ID of the current game sequence interval. The game calculation section 104 performs the game calculation based on data (game data) included in the packet that has been written into the packet buffer 171. Specifically, the game calculation section 104 performs the game sequence process in the current game sequence interval based on the data set (included) in the packet and the game program.

The packet processing section 102 discards the packet without writing the packet into the packet buffer 171 when the interval ID included in the packet does not coincide with the interval ID of the current game sequence interval. Specifically, the packet processing section 102 analyzes the interval ID included in the packet read from the communication buffer 197, and compares the interval ID included in the packet with the interval ID of the current game sequence interval. The packet processing section 102 does not write the packet into the packet buffer 171 when the interval ID included in the packet does not coincide with the interval ID of the current game sequence interval. Therefore, the packet is not transferred to the game calculation section 104 when the interval ID included in the packet does not coincide with the interval ID of the current game sequence interval.

The packet processing section 102 performs a game sequence interval synchronization process. For example, the packet processing section 102 synchronizes the game sequence interval of the game device with the game sequence interval of another game device. Specifically, the packet processing section 102 performs the interval synchronization process so that the game device and another game device (opposing game device) execute the same game sequence process at the same timing.

The game calculation section 104 causes a transition to the next game sequence interval to occur when the interval synchronization process has been completed. Specifically, the game calculation section 104 causes a transition to occur from the (N−1)th (N is an integer equal to larger than two) game sequence interval to the Nth game sequence interval.

For example, the packet processing section 102 generates a packet that includes an interval ID that indicates the (N−1)th game sequence interval in the (N−1)th game sequence interval, and transmits the generated packet to another game device. Likewise, the packet processing section 102 generates a packet that includes an interval ID that indicates the Nth game sequence interval in the Nth game sequence interval, and transmits the generated packet to another game device.

The packet processing section 102 performs an update process that increments or decrements an interval number (i.e., interval ID) when a transition from the (N−1)th game sequence interval to the Nth game sequence interval has occurred. For example, the packet processing section 102 monotonically increments or decrements the interval number each time a transition of the game sequence interval has occurred. Note that the interval ID (number) need not necessarily be incremented or decremented monotonically.

The packet processing section 102 performs the interval synchronization process by transferring (receiving and transmitting) a synchronization packet (synchronization request packet or synchronization response packet) between the game device and another game device. For example, when the game device has completed the (N−1)th game sequence interval and received a synchronization packet (synchronization request packet) that requests the interval synchronization process from another game device, the packet processing section 102 transmits a synchronization packet that notifies a transition to the Nth game sequence interval to the other game device. Specifically, when the game device has completed the (N−1)th game sequence interval and received a synchronization packet from another game device, the packet processing section 102 determines that a transition to the Nth game sequence interval is possible, and increments or decrements (updates) the interval ID. The packet processing section 102 performs the interval synchronization process by transmitting a synchronization packet that includes the updated interval ID to the other game device.

The network management section 110 determines that the network has been disconnected when the interval synchronization process has not been completed within a given period (given time). For example, the network management section 110 determines that the network has been disconnected when the game device has not received a synchronization packet from another game device within a given period after the game sequence interval has ended. The network management section 110 then displays a screen that notifies the player that the network has been disconnected (i.e., disconnected from the other game device) on the display section 190, for example.

When the game device is a host, the packet processing section 102 manages the interval ID, and notifies another game device (client) of a transition in the game sequence interval. For example, the packet processing section 102 receives a synchronization packet that requests synchronization from another game device, and updates the interval ID so that the game device (host) takes the initiative. The packet processing section 102 checks whether or not each game device connected thereto has completed the game sequence interval based on a synchronization packet received from each game device, for example. When the packet processing section 102 has confirmed that each game device has completed the game sequence interval, the packet processing section 102 causes a transition to the next game sequence interval to occur, and notifies each game device (client) of the transition in the game sequence interval. This makes it possible for the host to take the initiative in the game sequence interval synchronization process.

3. Method According to this Embodiment 3.1 Game Sequence Process

In this embodiment, a packet is transferred between the game device and another game device in each of a plurality of game sequence intervals, and the game sequence process is performed in each game sequence interval based on data transferred using the packet. The game sequence process is described below with reference to FIGS. 4A to 5B.

A lobby screen shown in FIG. 4A is displayed in the game sequence interval of the lobby process. When the player has selected an opposing player from the lobby screen, whether or not the player can play an online battle with the selected player is determined. When the player can play an online battle with the selected player, a transition to the game sequence interval of a character selection process occurs.

A character selection screen shown in FIG. 4B is displayed in the game sequence interval of the character selection process. Each of the player and the opposing player selects the desired character. A packet that includes operation data that has been input by the opposing player using the operation section when selecting the character is transmitted from the game device of the opposing player to the game device of the player. Likewise, a packet that includes operation data that has been input by the player when selecting the character is transmitted from the game device of the player to the game device of the opposing player. When the player and the opposing player have selected their characters, a transition to the game sequence interval of a process (data load process) that loads data (character data and game stage data) necessary for implementing the battle game occurs.

A screen shown in FIG. 4C is displayed in the game sequence interval of the data load process, and the game data is loaded from the storage section 170, the information storage medium 180, and the like. When the game data has been completely loaded, a transition to the game sequence interval of a character battle process occurs.

Figure 5A:
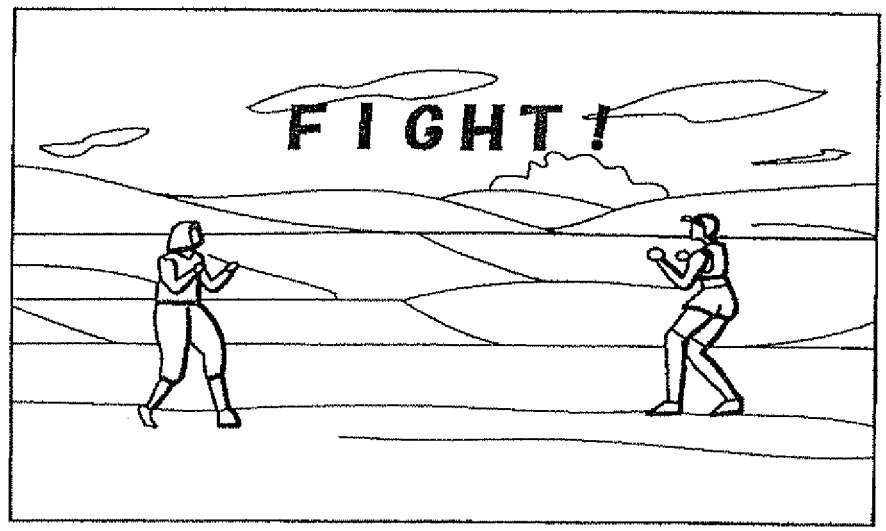
FIGS. 5A and 5B are views illustrative of a game sequence process.

A character battle game screen shown in FIG. 5A is displayed in the game sequence interval of the character battle process. Specifically, the character that is operated by the player and the opposing character that is operated by the opposing player are displayed, and make a motion based on operation data input by the player and the opposing player. A packet that includes operation data (key data) that has been input by the opposing player using the operation section for causing the opposing character to make a motion is transmitted from the game device of the opposing player to the game device of the player. Likewise, a packet that includes operation data that has been input by the player when for causing the character to make a motion is transmitted from the game device of the player to the game device of the opposing player.

When the character and the opposing character selected using the character selection screen play a plurality of rounds (i.e., a plurality of games) (e.g., fighting game), the game sequence interval may be set for each round. When one or more rounds have ended (i.e., the battle between the characters has ended), a transition to the game sequence interval of a game result display process occurs.

Figure 5B:
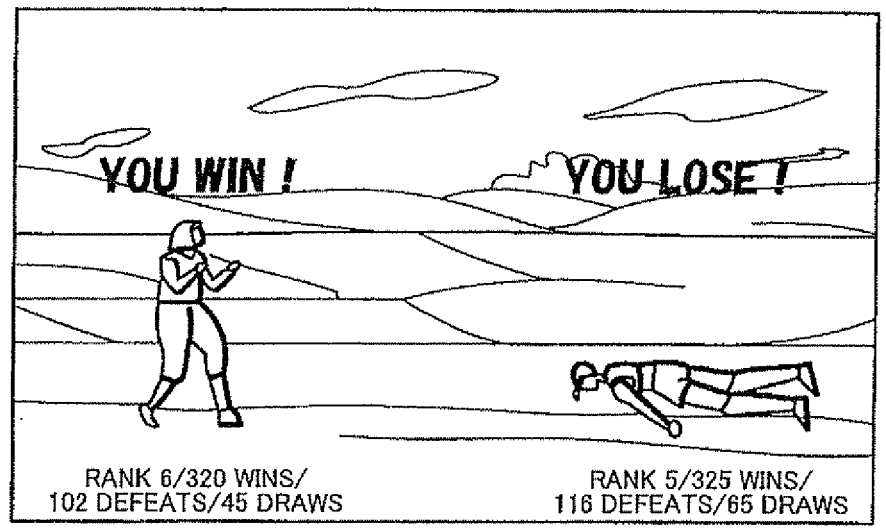

A game result display screen shown in FIG. 5B is displayed in the game sequence interval of the game result display process. Specifically, the game record, a battle end effect image, and the like are displayed. When the player has selected a rematch using another character, a transition to the game sequence interval of the character selection process shown in FIG. 4B occurs. When the player desires to select another opposing player, a transition to the game sequence interval of the lobby process shown in FIG. 4A occurs.

Figure 6:
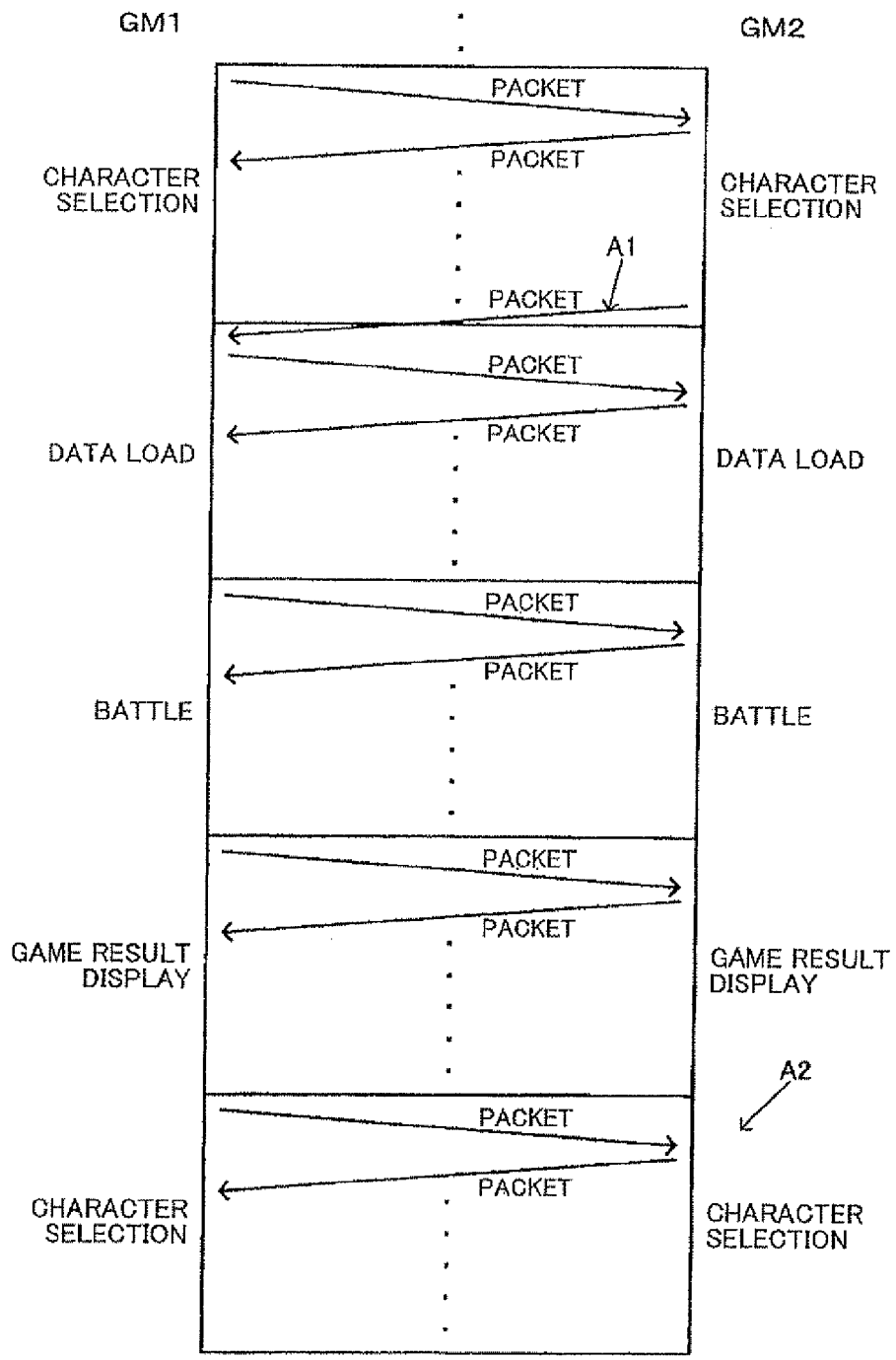
FIG. 6 is a view illustrative of a packet transfer performed in each game sequence interval.

FIG. 6 schematically shows packets transferred between the game devices GM1 and GM2 in the game sequence interval of each game sequence process (e.g., character selection process, data load process, battle process, or game result display process).

As shown in FIG. 6, a packet that includes data necessary for the game sequence process in the data field is transferred between the game devices GIM and GM2. When the game devices GM1 and GM2 have completed the game sequence interval, a transition to the next game sequence interval occurs, and a packet that includes data necessary for the new current game sequence interval is transferred between the game devices GM1 and GM2.

3.2 Packet Process Using Interval ID

The Transmission Control Protocol (TCP), the User Datagram Protocol (UDP), and the like have been known as a network data transfer communication protocol. TCP and UDP are protocols for the transport layer that is higher than the network layer (e.g., IP layer). TCP is effective when it is desired to accurately deliver the entire data, and UDP is effective when it is desired to quickly deliver data even if some pieces of data are lost halfway.

Specifically, TCP is a connection-oriented protocol that establishes a connection before actual communication, and guarantees delivery and the order of delivery of packets (data) transferred (see FIG. 7A). Specifically, TCP guarantees that packets that have been transmitted necessarily reach the destination in correct order.

On the other hand, UDP is a connectionless protocol, and does not guarantee delivery and the order of delivery of packets transferred (see FIG. 7B). Specifically, a packet is not retransmitted in the UDP layer. UDP does not guarantee that packets that have been transmitted necessarily reach the destination in correct order.

TCP has a disadvantage in that a packet transfer takes time due to retransmission and traffic (transfer rate) adjustments. UDP has immediacy as compared with TCP since packets are simply transferred. Therefore, UDP is suitable when it is desired to transfer data at high speed.

Accordingly, it is desirable to transfer a packet that includes data (e.g., operation data) that requires immediacy for achieving a smooth online game using UDP or a UDP-compliant protocol (hereinafter collectively referred to as "UDP"). For example, it takes time to transfer the operation data using TCP so that the movement of the character or the screen may be delayed (i.e., a time lag may occur). This may make it difficult to implement a smooth game sequence process.

On the other hand, since UDP does not guarantee delivery and the order of delivery of packets transferred (see FIG. 7B), the process of the game program may become complex, or the storage capacity of the buffer may be wasted.

Figure 8:
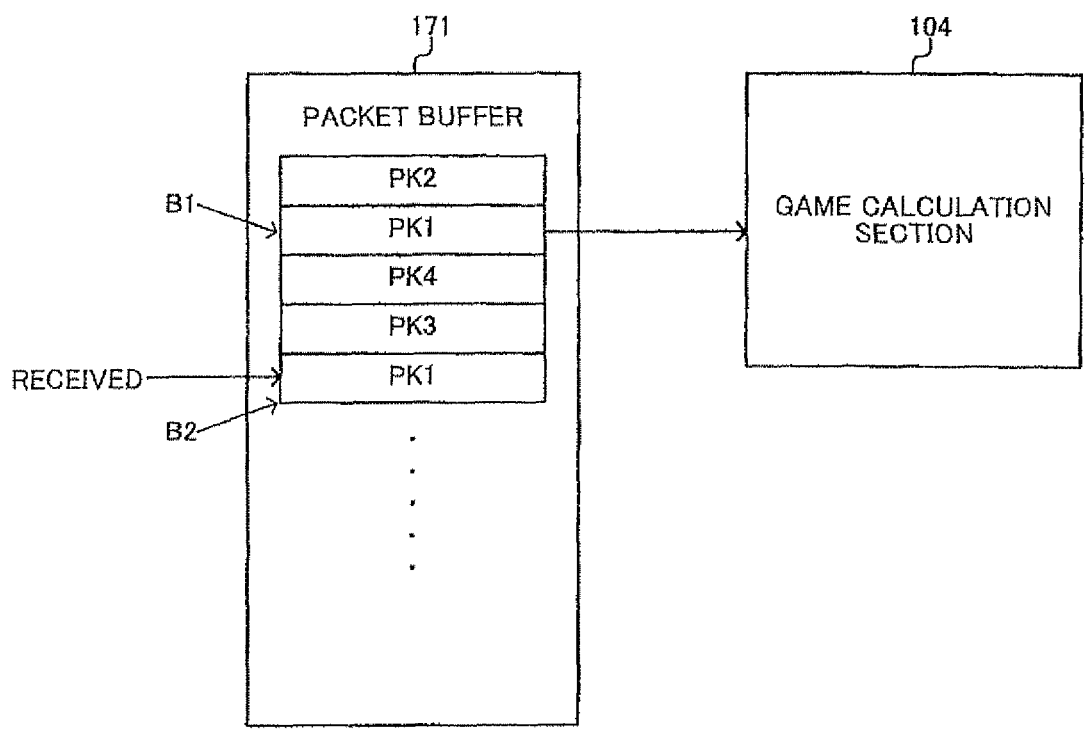
FIG. 8 is a view illustrative of a packet reception process using a packet buffer.

In FIG. 8, a packet received from another game device is written into the packet buffer 171. In this case, since UDP does not guarantee delivery of packets, an acknowledgement may not reach the transmitter-side game device although the transmitter-side game device has transmitted a packet and the receiver-side game device has transmitted an acknowledgement (response) that notifies that the packet has been safely received, for example. In this case, since the transmitter-side game device retransmits the packet, unnecessary packets are stored in the packet buffer 171 of the receiver-side game device.

In FIG. 8, the receiver-side game device has received a packet PK1 indicated by B1, and the game calculation section 104 has completed the process based on the packet PK1 indicated by B1. However, when an acknowledgement of the packet PK1 does not reach the transmitter-side game device, the packet PK1 received from the transmitter-side game device is again written into the packet buffer 171 (see B2). Since the game calculation section 104 of the receiver-side game device has completed the game calculation process based on the packet PK1, the packet indicated by B2 remains in the packet buffer 171, so that the storage capacity of the packet buffer 171 is wasted.

A packet transferred in each game sequence interval (see FIG. 6) is necessary for the game calculation process performed in each game sequence interval, but is unnecessary in the next game sequence interval. Therefore, if a packet necessary for the preceding game sequence interval remains in the packet buffer 171 after a transition to the next game sequence interval has occurred, the storage capacity of the packet buffer 171 is wasted. For example, when a packet that has been transferred during the preceding character selection process (see A1 in FIG. 6) remains in the packet buffer 171 during the subsequent character selection process (see A2), a wrong screen (image) may be displayed (e.g., a cursor moves undesirably on the character selection screen).

In order to deal with the above problems, this embodiment employs a method that incorporates the interval ID of the game sequence interval in a packet transferred between the game devices, and performs the packet process using the interval ID.

Figure 9:
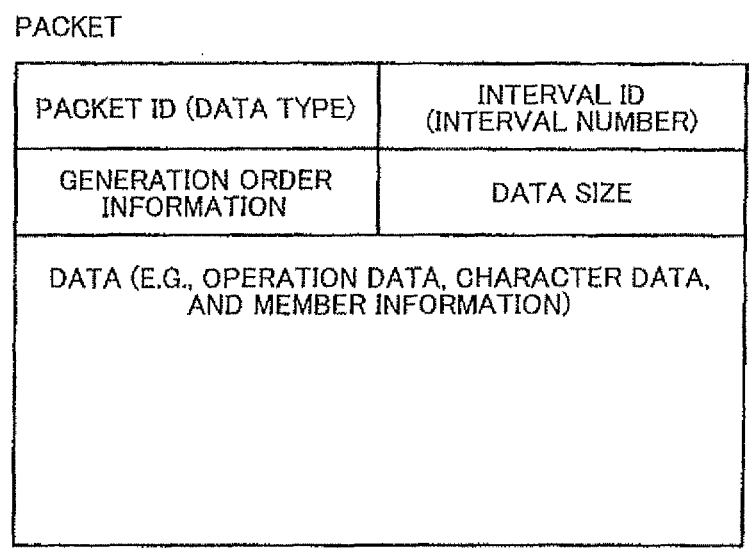
FIG. 9 shows a format example of a packet used in connection with one embodiment of the invention.

FIG. 9 shows a format example of a packet transferred between the game devices. Note that the format of the packet used in connection with this embodiment is not limited to that shown in FIG. 9. Various modifications may be made of the packet field settings and information set in the packet.

As shown in FIG. 9, a packet ID, an interval ID (interval number in a narrow sense), generation order information, a data size, and data are set in the packet. Note that the packet may have a format in which some of these fields (information) are omitted.

The packet ID is identification information that specifies the type of data transferred using the packet (identification information that specifies the packet type). Examples of the data transferred using the packet include operation data (key input data), character data, voice chat data, communication member information, game rule information, presence confirmation information, synchronization request or synchronization response information, character position information, and the like. The packet ID specifies the information type of the data transferred using the packet.

The interval ID is identification information that specifies the game sequence interval that utilizes the data transferred using the packet (identification information that specifies the game sequence interval). For example, when a transition in the game sequence interval sequentially occurs (see FIG. 6), the interval ID specifies the game sequence interval to which the packet belongs.

The generation order information (transmission order information) specifies the packet generation order (transmission order) of another game device. Specifically, the disadvantage of UDP (i.e., the order of delivery of packets is not guaranteed (see FIG. 7B)) can be compensated for by incorporating the generation order information in the packet so that the packets can be rearranged in the generation order of the transmitter-side game device.

The data size is information that indicates the size of the data transferred using the packet. The data size is unnecessary when the packet does not have a variable length, for example.

Figure 10:
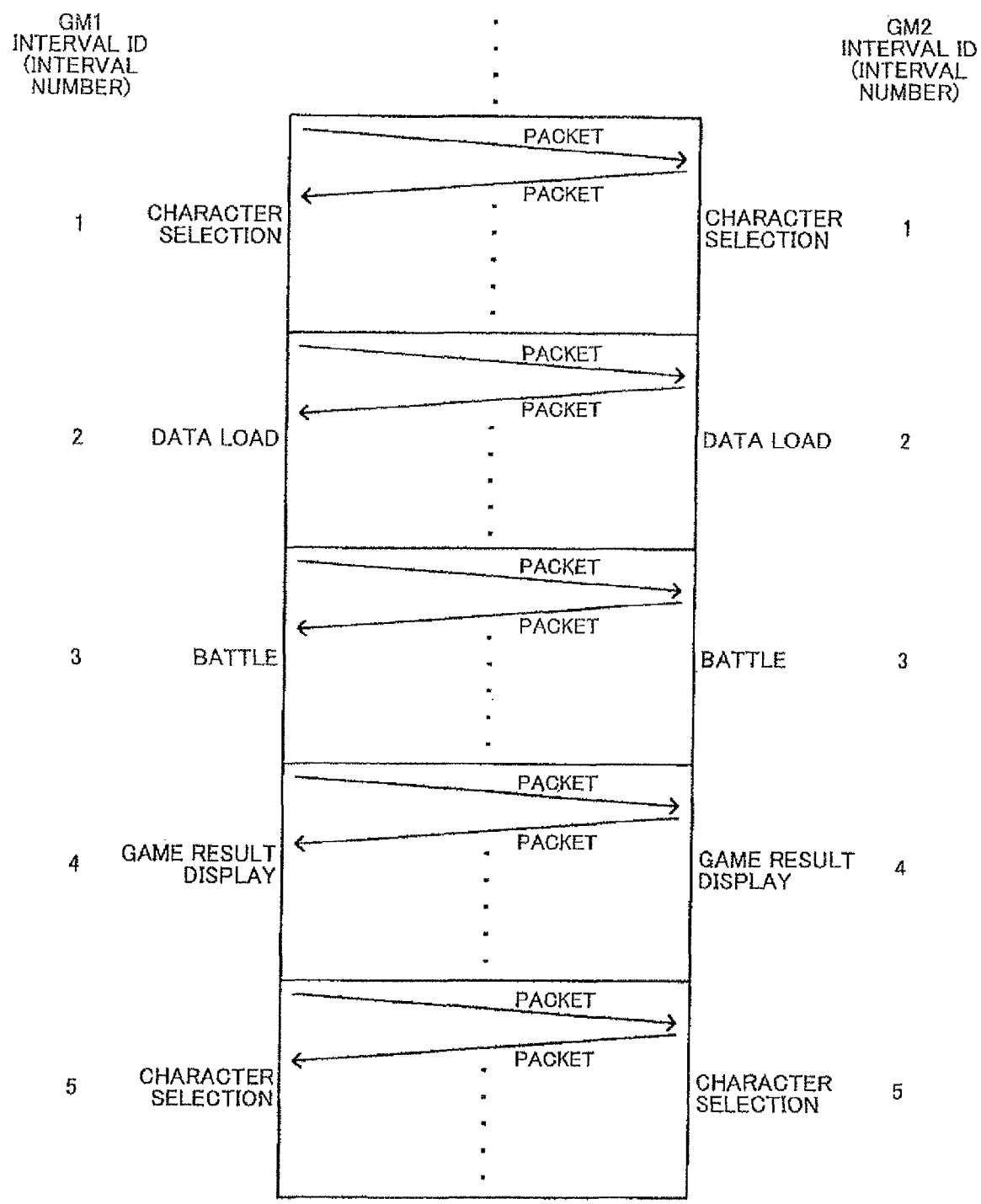
FIG. 10 is a view illustrative of a packet process according to one embodiment of the invention that uses an interval ID.

The method according to this embodiment is described in detail below with reference to FIG. 10. As shown in FIG. 10, the interval ID is linked to each game sequence interval (e.g., character selection, data load, battle, or game result display). The interval ID may be linked to each game sequence interval by the interval synchronization process (described later), for example.

As shown in FIG. 10, the interval ID (interval number) is incremented each time a transition in the game sequence interval has occurred. Note that the interval ID may be decremented each time a transition in the game sequence interval has occurred. The increment value or the decrement value is not limited to "1", but may be a value larger than "1". The interval ID is a value that at least allows the corresponding game sequence interval to be distinguished from other game sequence intervals, and is not limited to a value that is incremented or decremented monotonically (see FIG. 10).

Figure 11A:
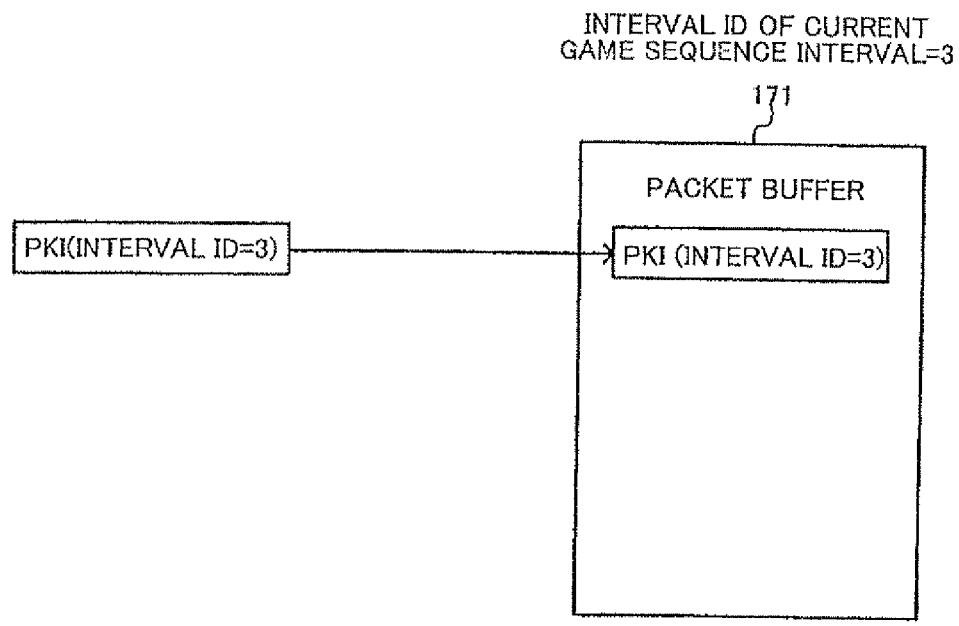
FIGS. 11A and 11B are views illustrative of a packet process according to one embodiment of the invention that uses an interval ID.

As shown in FIG. 11A, the interval ID set (included) in the received packet PKI is compared with the interval ID of the game sequence interval of the game sequence process that is currently performed by the game device (coincidence determination process). In FIG. 11A, the interval ID included in the packet PKI is "3", and the interval ID of the current game sequence interval is also "3" (i.e., the interval ID included in the packet PKI coincides with the interval ID of the current game sequence interval). Therefore, the packet PKI is written into the packet buffer 171.

Figure 11B:
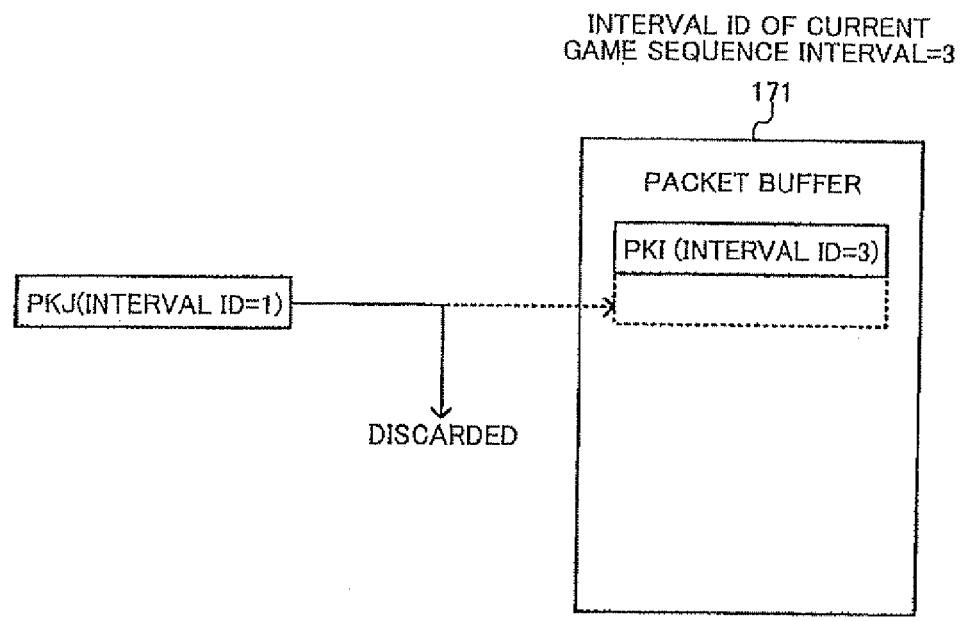

In FIG. 11B, the interval ID included in the packet PKI is "1", and the interval ID of the current game sequence interval is "3" (i.e., the interval ID included in the packet PKI does not coincide with the interval ID of the current game sequence interval). In this case, the packet PKI is discarded (is not used) without being written into the packet buffer 171.

If packets are thus written into the packet buffer 171 while performing the interval ID comparison process, only packets corresponding to the interval ID of each game sequence interval are stored in the packet buffer 171 in each game sequence interval.

In FIG. 12A, since the interval ID of the current game sequence interval is "3", only packets that include the interval ID=3 are stored in the packet buffer 171. Specifically, when the communication section 196 has received a packet that includes an interval ID other than "3", the received packet is not written into the packet buffer 171. Therefore, the game calculation section 104 can perform the game sequence process having the interval ID=3 (e.g., character battle process shown in FIG. 10) using the data included in the packets that include the interval ID=3.

In FIG. 12B, since the interval ID of the current game sequence interval is "4", only packets that include the interval ID=4 are stored in the packet buffer 171. Therefore, the game calculation section 104 can perform the game sequence process having the interval ID=4 (e.g., game result display process shown in FIG. 10) using the data included in the packets that include the interval ID=4. This makes it possible to simplify the process performed by the game calculation section 104 while improving the process efficiency.

When a transition occurs from the game sequence interval having the interval ID=3 to the game sequence interval having the interval ID=4 (i.e., a transition occurs from FIG. 12A to FIG. 12B), it is desirable to clear (delete) the packets that include the interval ID=3 from the packet buffer 171.

As described above, this embodiment employs the method that provides the interval ID field in the packet, and performs the game sequence interval comparison process using the interval ID. This prevents a situation in which a packet that has become unnecessary due to a transition to the subsequent game sequence interval remains in the packet buffer 171 so that the storage capacity of the packet buffer 171 is wasted.

According to this embodiment, it is also possible to prevent a situation in which a packet that has been used in the preceding game sequence interval remains in the packet buffer 171 and is erroneously determined to be a packet that is used in the current game sequence interval so that a wrong game calculation process is performed.

According to this embodiment, it is also possible to implement packet management so that only packets that include the interval ID of the current game sequence interval are stored in the packet buffer 171 (see FIGS. 12A and 12B). Therefore, the packet management process and the game calculation process performed by the game calculation section 104 can be simplified while improving the process efficiency, so that processing overhead can be reduced.

3.3 Interval Synchronization Process

This embodiment employs the interval synchronization process that synchronizes the game sequence interval between the game devices.

Figure 13:
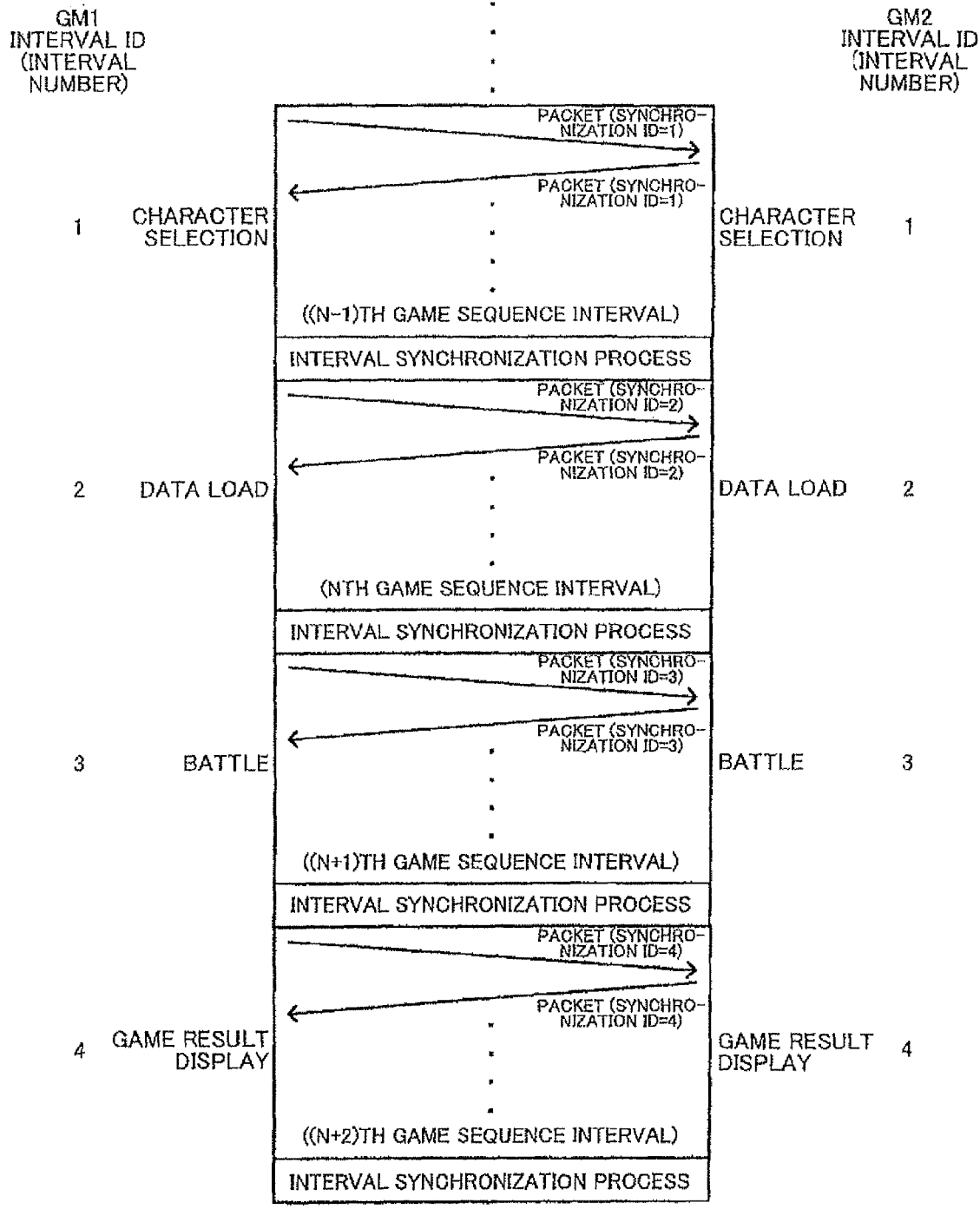
FIG. 13 is a view illustrative of an interval synchronization process according to one embodiment of the invention.

In FIG. 13, the interval synchronization process that synchronizes the game sequence interval between the game devices GM1 and GM2 is performed after completion of the character selection game sequence interval. Specifically, the interval synchronization process causes the game devices GM1 and GM2 to perform the process of the game sequence interval having the same interval ID.

As shown in FIG. 13, when the interval synchronization process after the character selection game sequence interval has ended, a transition occurs from the character selection game sequence interval ((N−1)th game sequence interval in a broad sense) to the data load game sequence interval (Nth game sequence interval in a broad sense).

Likewise, when the data load game sequence interval has ended, the game sequence interval synchronization process is performed. When the interval synchronization process has been completed, a transition occurs from the data load game sequence interval (Nth game sequence interval) to the character battle game sequence interval ((N+1)th game sequence interval).

The interval ID (interval number) is updated each time a transition in the game sequence interval has occurred after completion of the interval synchronization process. In FIG. 13, when the interval synchronization process has been performed after the character selection game sequence interval and a transition has occurred from the character selection game sequence interval to the data load game sequence interval, the interval ID is incremented to "2" from "1". When the interval synchronization process has been performed after the data load game sequence interval and a transition has occurred from the data load game sequence interval to the character battle game sequence interval, the interval ID is incremented to "3" from "2". Specifically, the interval ID is incremented by one each time the interval synchronization process has been performed. Note that the interval ID may be decremented instead of incrementing the interval ID.

A packet that includes the interval ID thus updated is transferred between the game devices GM1 and GM2 in each game sequence interval.

In the character selection game sequence interval ((N−1)th game sequence interval), for example, a packet that includes the interval ID=1 that indicates the character selection game sequence interval is generated, and transmitted from the game device GM1 to the game device GM2, or transmitted from the game device GM2 to the game device GM1, as shown in FIG. 13.

In the data load game sequence interval (Nth game sequence interval), a packet that includes the interval ID=2 that indicates the data load game sequence interval is generated, and transmitted from the game device GM1 to the game device GM2, or transmitted from the game device GM2 to the game device GM1.

This makes it possible to cause the game devices GM1 and GM2 to update the interval ID in synchronization. Moreover, the interval ID can be linked to each game sequence interval in each of the game devices GM1 and GM2. Specifically, the game device GM1 can link "1", "2", "3", and "4" respectively to the character selection game sequence interval, the data load game sequence interval, the battle game sequence interval, and the game result display game sequence interval as the interval ID, as shown in FIG. 13. Likewise, the game device GM2 can link "1", "2", "3", and "4" respectively to the character selection game sequence interval, the data load game sequence interval, the battle game sequence interval, and the game result display game sequence interval as the interval ID. This makes it possible to implement a packet process that compares the interval ID included in the packet with the interval ID that is linked to the current game sequence interval, and writes the packet into the packet buffer 171 based on the comparison result, as described with reference to FIGS. 11A to 12B.

In this embodiment, the interval synchronization process is implemented by transferring the synchronization packet between the game devices. Specifically, the interval synchronization process shown in FIG. 13 is implemented by transferring a packet that includes the packet ID (see FIG. 9) that indicates the synchronization packet between the game devices GM1 and GM2. For example, the interval synchronization process is implemented by causing the game device GM2 to transmit a synchronization packet that requests game sequence interval synchronization to the game device GM1, and causing the game device GM1 to transmit a synchronization packet that responds to the synchronization request to the game device GM2.

Figure 14:
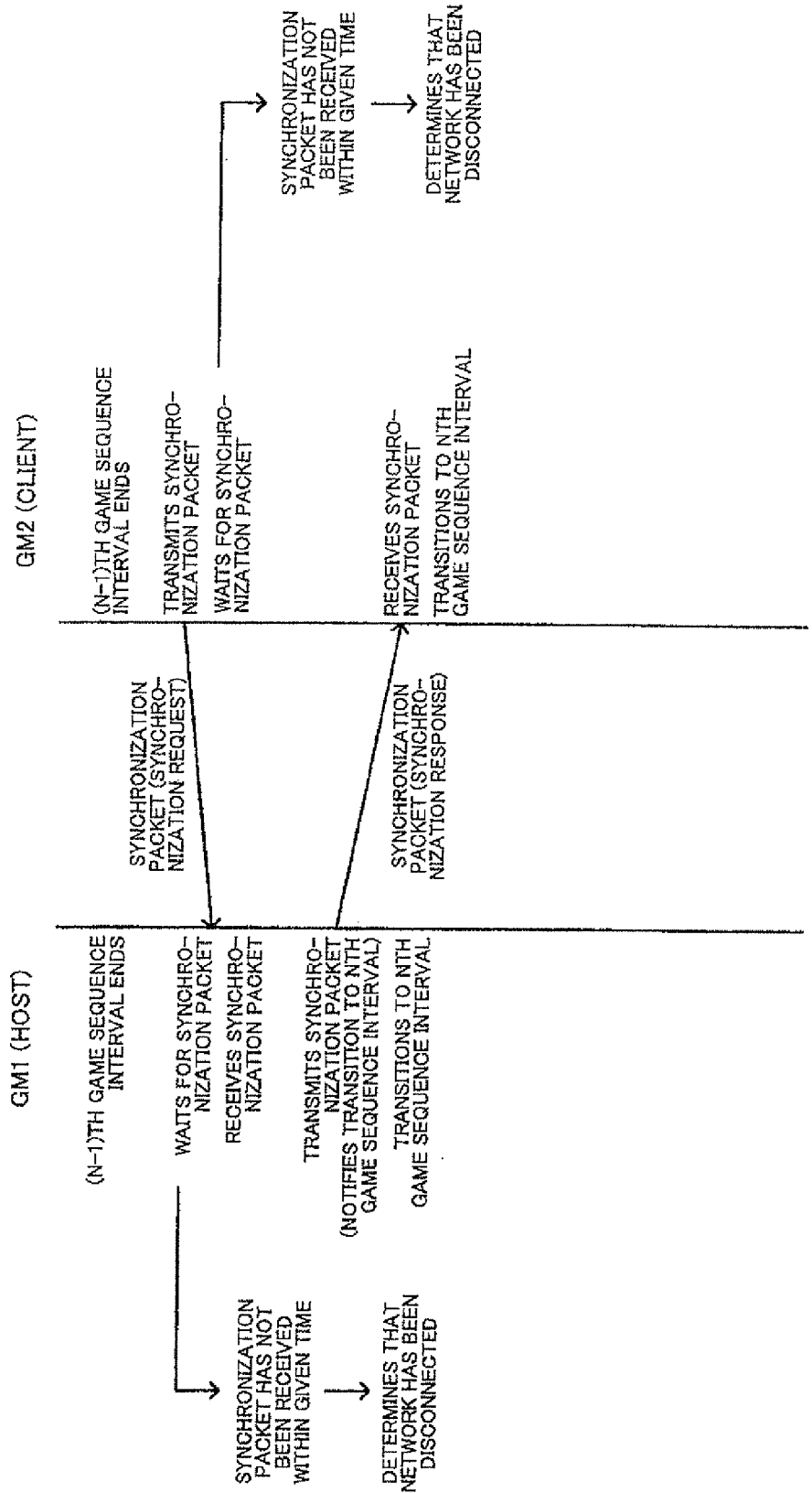
FIG. 14 is a view illustrative of a specific example of an interval synchronization process according to one embodiment of the invention.

FIG. 14 shows a specific example of the interval synchronization process using the synchronization packet. FIG. 14 shows a processing example when the game device GM1 is a host and the game device GM2 is a client.

The game device GM2 (another game device) (client) transmits a synchronization packet (synchronization request packet) that requests the interval synchronization process to the game device GM1 (host) when the (N−1)th game sequence interval has ended. The game device GM2 waits for a synchronization packet to be received from the game device GM1 after transmitting the synchronization packet. When the game device GM2 has not received a synchronization packet within a given time, the game device GM2 determines that the network that connects the game devices GM1 and GM2 has been disconnected (communication connection has been terminated). The game device GM2 then displays a screen that notifies the player that the network has been disconnected on the display section of the game device GM2.

The game device GM1 (player's game device) (host) waits for a synchronization packet to be received from the game device GM2 when the (N−1)th game sequence interval has ended. When the game device GM1 has not received a synchronization packet within a given time, the game device GM1 determines that the network that connects the game devices GM1 and GM2 has been disconnected. The game device GM1 then displays a screen that notifies the player that the network has been disconnected on the display section of the game device GM1.

When the game device GM1 has received a synchronization packet from the game device GM2, the game device GM1 transmits a synchronization packet (synchronization response packet) that notifies the game device GM2 of a transition to the Nth game sequence interval to the game device GM2 (i.e., a transition to the Nth game sequence interval occurs). When the game device GM2 has received the synchronization packet transmitted from the game device GM1, a transition to the Nth game sequence interval also occurs.

The interval ID is set in the synchronization packet transmitted from the game device GM1 to the game device GM2. In FIG. 13, a synchronization packet that includes the interval ID=1 is transmitted to the game device GM2 in the character selection game sequence interval, and a synchronization packet that includes the interval ID=2 is transmitted to the game device GM2 in the data load game sequence interval, for example.

Note that the game device GM2 may transmit a synchronization packet that includes the synchronization ID corresponding to the Nth game sequence interval after the (N−1)th game sequence interval has ended in the game device GM2. The game device GM1 transmits the synchronization packet received from the game device GM1 to the game device GM2 when the (N−1)th game sequence interval has ended. The interval synchronization process may be implemented in this manner.

The above description has been given taking an example in which a packet is transferred between two game devices that are connected via a network. Note that the method according to this embodiment may be similarly applied to a case where three or more game devices are connected via a network (see FIGS. 1A, 1B, and 2B).

In the connection example shown in FIG. 2B, the process described with reference to FIGS. 10 to 14 may be performed between the game device GM1 and each of the game devices GM2, GM3, and GM4. For example, a game device GM2 packet area, a game device GM3 packet area, and a game device GM4 packet area may be allocated in the packet buffer 171, and the packet process is then performed. In this case, an identical synchronization ID may be used for the game devices GM2, GM3, and GM4, or different synchronization ID may be used for the game devices GM2, GM3, and GM4.

When the game device GM1 is assigned to a host and the remaining game devices are assigned to clients, the game device GM1 (host) takes the initiative in the interval ID management process and the game sequence interval transition process.

Figure 15A:
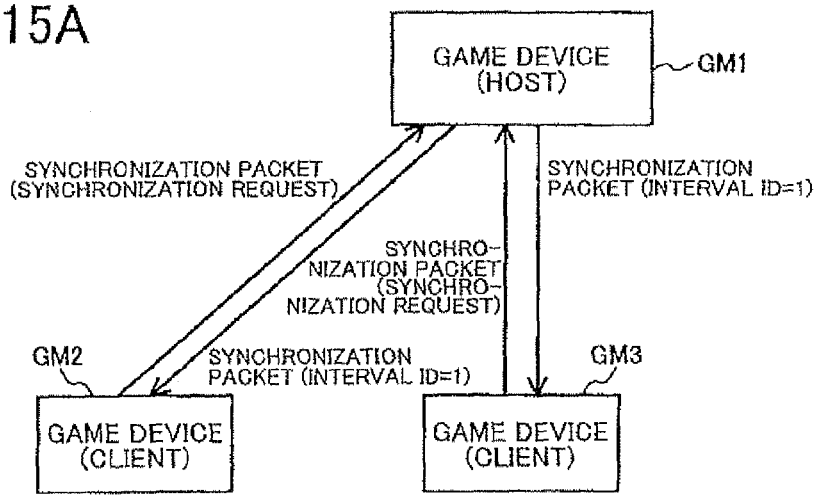
FIGS. 15A to 15C are views illustrative of an interval synchronization process when the game device is a host.
Figure 15B:
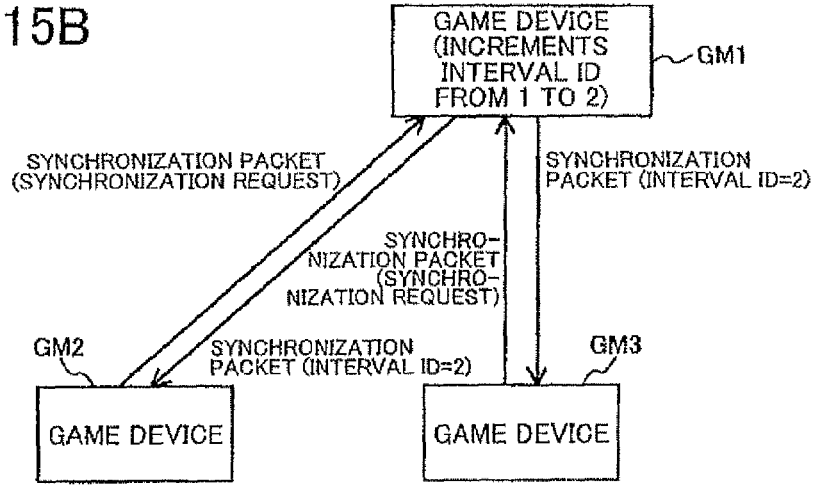
Figure 15C:
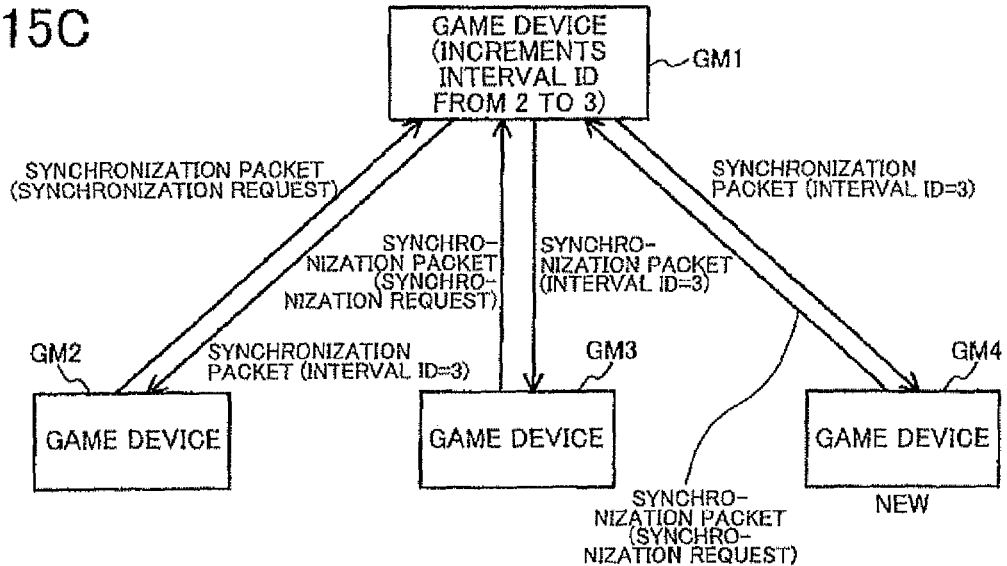

FIGS. 15A to 15C show processing examples when the game device GM1 is a host and the game devices GM2 and GM3 are clients.

As shown in FIG. 15A, the game devices GM2 and GM3 (clients) transmit a synchronization packet that requests the interval synchronization process to the game device GM1 (host) when the (N−1)th game sequence interval has ended. The game device GM1 performs the interval ID update process when the game device GM1 has determined that the game device GM1 has completed the (N−1)th game sequence interval, and determined that the game devices GM2 and GM3 have also completed the (N−1)th game sequence interval based on synchronization packets received from the game devices GM2 and GM3. The game device GM1 transmits a packet that includes the interval ID=1 to the game devices GM2 and GM3 to notify the game devices GM2 and GM3 (clients) of a transition to the Nth game sequence interval. A transition to the Nth game sequence interval then occurs.

As shown in FIG. 15B, the game devices GM2 and GM3 transmit a synchronization packet to the game device GM1 when the Nth game sequence interval has ended. The game device GM1 updates the interval ID to "2" from "1" when the game device GM1 has determined that the game device GM1 has completed the Nth game sequence interval, and determined that the game devices GM2 and GM3 have also completed the Nth game sequence interval based on synchronization packets received from the game devices GM2 and GM3. The game device GM1 then transmits a packet that includes the interval ID=2 to the game devices GM2 and GM3 to notify the game devices GM2 and GM3 (clients) of a transition to the (N+1)th game sequence interval, and a transition to the (N+1)th game sequence interval occurs.

In FIGS. 15A and 15B, the game device GM1 (host) thus manages the interval ID. When the game device GM1 has confirmed that all of the game devices GM2 and GM3 connected to the game device GM1 have completed the preceding game sequence interval, the game device GM1 notifies the game devices GM2 and GM3 of a transition to the next game sequence interval using a synchronization packet, and a transition to the next game sequence interval occurs. Specifically, the host takes the initiative in the interval ID update process and the game sequence interval transition process. According to the above configuration, the interval synchronization process can be stably implemented under control of the game device that serves as a host, even if a number of game devices are connected via a network.

In FIG. 15C, a game device GM4 further participates in the network (online) game. In FIG. 15C, the game device GM1 (host) transmits a synchronization packet that includes the latest interval ID=3 to the game device GM4 in response to an interval synchronization request transmitted from the game device GM4. Therefore, the game device GM1 can thus take the initiative in the interval synchronization process that is performed by the game devices GM1, GM2, GM3, and GM4.

Although FIGS. 15A to 15C illustrate a case where the game devices GM1 to GM4 necessarily use an identical interval ID, the interval ID may be differ between the game devices. For example, when the game device GM4 further participates in the network (online) game, a packet that includes an interval ID differing from the interval ID used for the game devices GM2 and GM3 may be transmitted to the game device GM4.

4. Specific Processing

A specific processing example according to this embodiment is described below with reference to flowcharts shown in FIGS. 16 to 18.

Figure 16:
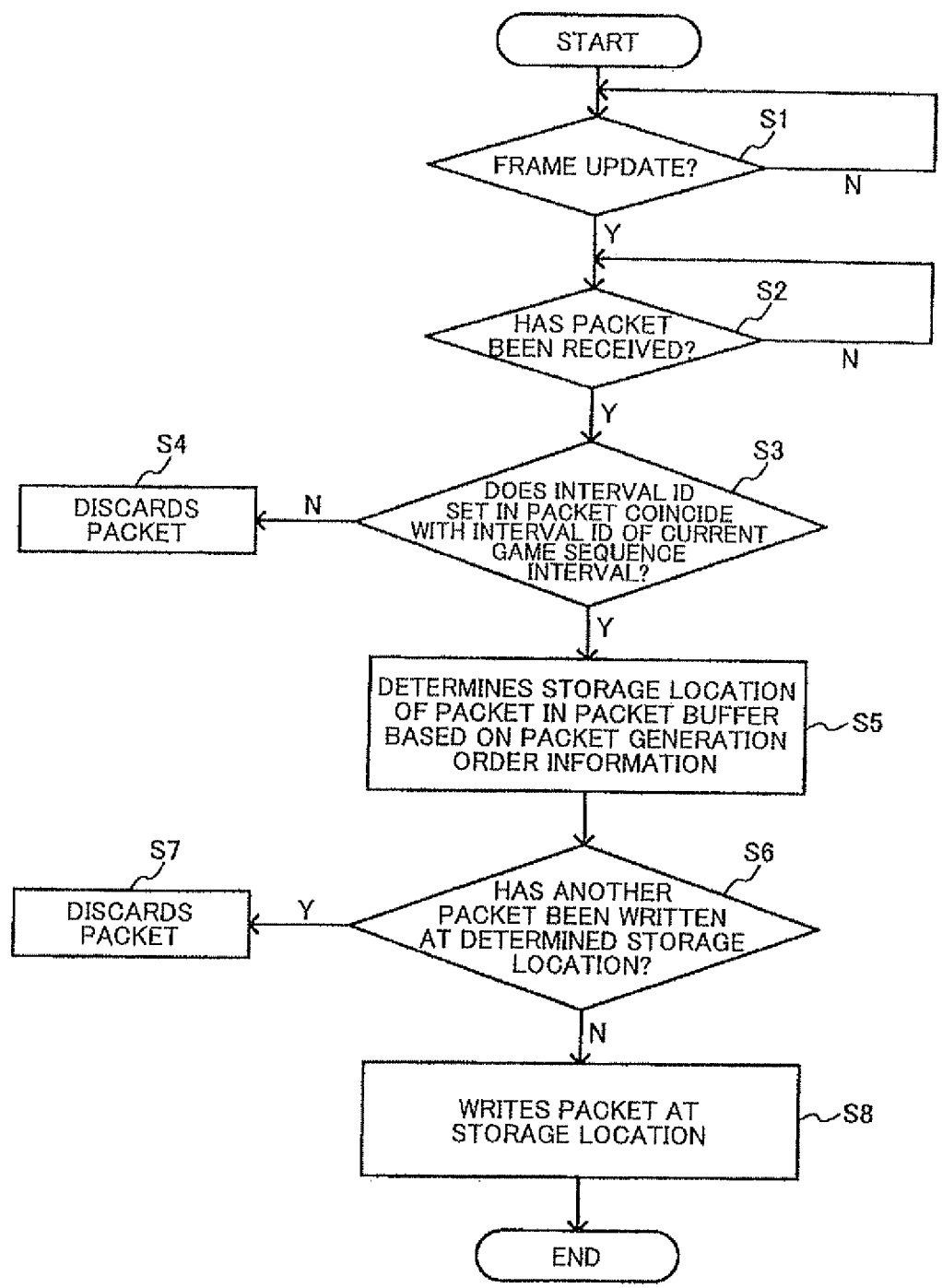
FIG. 16 is a flowchart showing a specific processing example according to one embodiment of the invention.

FIG. 16 is a flowchart showing the packet process. Whether or not a frame update (1/60th of a second) timing has been reached is determined (step S1). When the frame update timing has been reached, whether or not a packet has been received is determined (step S2). For example, whether or not a packet has been stored (received) in the communication buffer 197 (socket buffer) shown in FIG. 3 is determined.

When a packet has been received, whether or not the interval ID set in the received packet coincides with the interval ID of the current game sequence interval is determined (step S3). Specifically, whether or not the interval ID set in the received packet coincides with the interval ID that is linked to the game sequence interval of the game sequence process that has been performed when the packet has been received is determined.

When the interval ID set in the received packet does not coincide with the interval ID of the current game sequence interval, the packet is discarded (step S4). Specifically, the packet is not written into the packet buffer 171.

When the interval ID set in the received packet coincides with the interval ID of the current game sequence interval, the storage location of the packet in the packet buffer 171 is determined based on the packet generation order information set in the packet (step S5). For example, when a packet PK3 (generation order=3) has been received in a state in which a packet PK1 (generation order=1), a packet PK2 (generation order=2), and a packet PK4 (generation order=4) have been stored in the packet buffer 171, the storage location between the storage location of the packet PK2 and the storage location of the packet PK4 is determined to be the storage location of the packet PK3.

Whether or not another packet has been written at the determined storage location is then determined (step S6). When another packet has been written at the determined storage location, the packet is discarded without writing the packet into the packet buffer 171 (step S7). When another packet has not been written at the determined storage location, the packet is written at the storage location determined by the step S5 (step S8). For example, when the packet PK3 has been written at the storage location between the storage location of the packet PK2 and the storage location of the packet PK4, the received packet is discarded. When the packet PK3 has not been written at the storage location between the storage location of the packet PK2 and the storage location of the packet PK4, the received packet is written at the storage location between the storage location of the packet PK2 and the storage location of the packet PK4.

Figure 17:
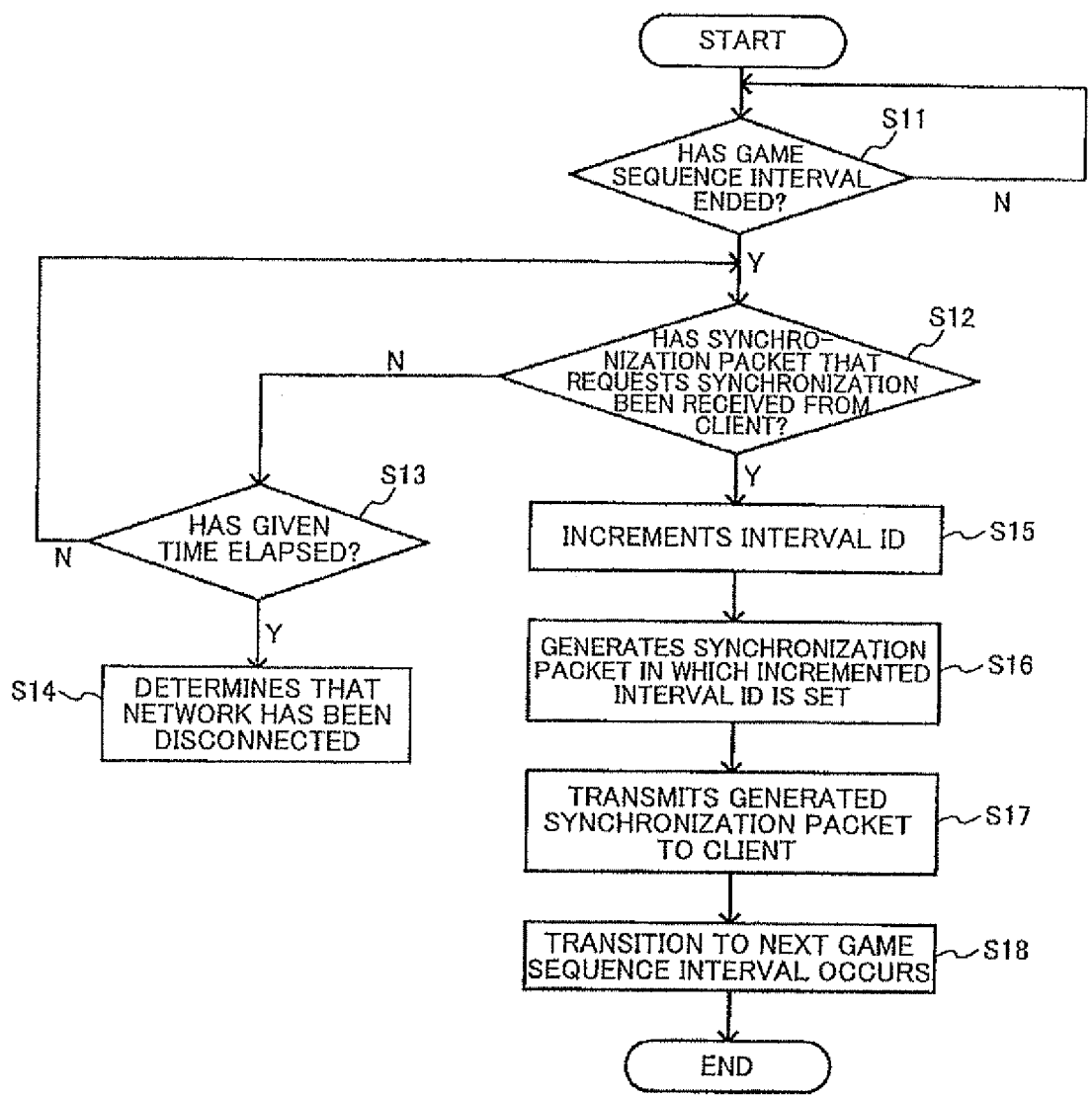
FIG. 17 is a flowchart showing a specific processing example according to one embodiment of the invention.

FIG. 17 is a flowchart showing the interval synchronization process performed by the host game device. Whether or not the game sequence interval has ended is determined (step S11). When it has been determined that the game sequence interval has ended, whether or not a synchronization packet that requests synchronization has been received from the client game device is determined (step S12). When a synchronization packet that requests synchronization has not been received from the client game device, whether or not a given time (given period) has elapsed is determined (step S13). When the given time has elapsed, it is determined that the network that connects the host game device and the client game device has been disconnected (step S14).

When it has been determined that a synchronization packet has been received from the client game device in the step S12, the interval ID is incremented (step S15). When a plurality of client game devices are connected via the network, the interval ID is incremented when a synchronization packet has been received from all of the client game devices. A synchronization packet in which the incremented interval ID is set is generated (step S16), and transmitted to the client game device (step S17). A transition to the next game sequence interval then occurs (step S18).

Figure 18:
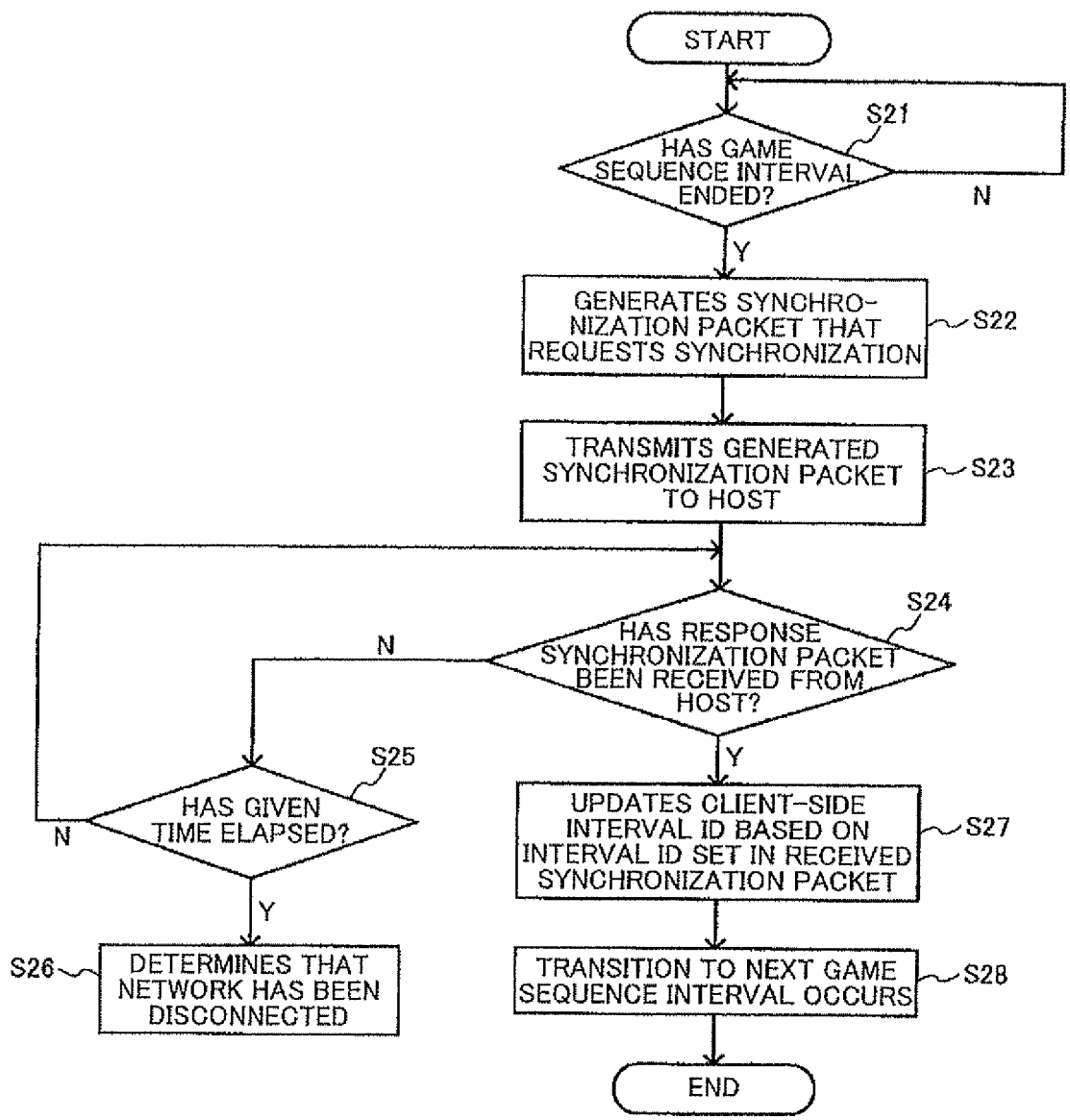
FIG. 18 is a flowchart showing a specific processing example according to one embodiment of the invention.

FIG. 18 is a flowchart showing the interval synchronization process performed by the client game device. Whether or not the game sequence interval has ended is determined (step S21). When it has been determined that the game sequence interval has ended, a synchronization packet that requests synchronization is generated (step S22), and transmitted to the host game device (step S23).

Whether or not a response synchronization packet has been received from the host game device is then determined (step S24). When a response synchronization packet has not been received from the host game device, whether or not a given time has elapsed is determined (step S25). When the given time has elapsed, it is determined that the network that connects the client game device and the host game device has been disconnected (step S26).

When it has been determined that a synchronization packet has been received from the host game device in the step S24, the client-side interval ID is updated based on the interval ID set in the received synchronization packet (step S27), and a transition to the next game sequence interval occurs (step S28). This makes it possible to synchronize the interval ID and the game sequence interval between the host game device and the client game device.

Although some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term cited with a different term having a broader meaning or the same meaning at least once in the specification and the drawings can be replaced by the different term in any place in the specification and the drawings.

The packet process, the interval synchronization process, the game calculation process, and the like are not limited to those described in connection with the above embodiments. Methods equivalent to these methods are included within the scope of the invention. The invention may be applied to various games. The invention may be applied to various game systems such as an arcade game system, a consumer game system, a large-scale attraction system in which a number of players participate, a simulator, a multimedia terminal, a system board that generates a game image, and a mobile phone.

What is claimed is:

1. A game device comprising:
    a packet processing section that processes a packet that is transferred between the game device and another game device via a network;
    a game calculation section that performs a game calculation process based on data transferred by the packet; and
    an image generation section that generates an image based on a result of the game calculation process,
    the game calculation section performing a game sequence process as the game calculation process in each of a plurality of game sequence intervals,
    the packet transferred between the game device and the other game device including an interval ID that specifies a game sequence interval in which data transferred by the packet is used,
    the packet processing section comparing the interval ID included in the received packet with the interval ID of a current game sequence interval, and
    the game calculation section performing the game calculation process based on data included in the packet when the interval ID included in the packet coincides with the interval ID of the current game sequence interval.

2. The game device as defined in claim 1, further comprising:
    a packet buffer that stores the packet received from the other game device,
    the packet processing section writing the packet into the packet buffer when the interval ID included in the packet coincides with the interval ID of the current game sequence interval, and
    the game calculation section performing the game calculation process based on data included in the packet that has been written into the packet buffer.

3. The game device as defined in claim 2,
    the packet processing section discarding a packet without writing the packet into the packet buffer when the interval ID included in the packet does not coincide with the interval ID of the current game sequence interval.

4. The game device as defined in claim 1,
    the packet processing section performing an interval synchronization process that synchronizes the game sequence interval of the game device with the game sequence interval of the other game device, and
    the game calculation section causing a transition from an (N−1)th game sequence interval to an Nth game sequence interval to occur when the interval synchronization process has been completed.

5. The game device as defined in claim 4,
    the packet processing section generating the packet that includes the interval ID that indicates the Nth game sequence interval in the Nth game sequence interval, and transmitting the generated packet to the other game device.

6. The game device as defined in claim 4,
    the packet processing section performing an update process that increments or decrements the interval ID when the transition from the (N−1)th game sequence interval to the Nth game sequence interval has occurred.

7. The game device as defined in claim 4,
    the packet processing section performing the interval synchronization process by transferring a synchronization packet between the game device and the other game device.

8. The game device as defined in claim 7,
    the packet processing section transmitting a synchronization packet that notifies the transition to the Nth game sequence interval to the other game device when the game device has completed the (N−1)th game sequence interval and received a synchronization packet that requests the interval synchronization process from the other game device.

9. The game device as defined in claim 4, further comprising:
    a network management section that performs a network management process,
    the network management section determining that the network has been disconnected when the interval synchronization process has not been completed within a given period.

10. The game device as defined in claim 1,
    the packet processing section managing the interval ID, and notifying the other game device that is a client of a transition of the game sequence interval when the game device is a host.

11. The game device as defined in claim 1,
    the game calculation section performing at least one of a character selection process that selects a character that appears in a game, a data load process that loads data necessary for the game, a character battle process, and a game result display process as the game sequence process performed in each of the plurality of game sequence intervals.

12. The game device as defined in claim 1, wherein the interval ID is identification information that specifies the game sequence interval.

13. The game device as defined in claim 1, wherein each game sequence interval is linked to an interval ID.

14. The game device as defined in claim 1, wherein
    the game sequence interval is an interval in which the game sequence process is performed, and the game sequence process performed in each of the plurality of game sequence intervals includes at least one of (1) a character selection process that selects a character that appears in a game, (2) a data load process that loads data necessary for the game, (3) a character battle process, (4) a game result display process, (5) a lobby process for a player to participate in an online game, (6) an opening screen display process of the game, (7) an ending screen display process of the game, and (8) a demonstration screen display process of the game.

15. A method of controlling a game device comprising:
processing a packet that is transferred between the game device and another game device via a network;
performing a game calculation process based on data transferred by the packet, the game calculation process performing a game sequence process in each of a plurality of game sequence intervals, the packet transferred between the game device and the other game device including an interval ID that specifies a game sequence interval in which data transferred by the packet is used;
generating an image based on a result of the game calculation process;
comparing the interval ID included in the received packet with the interval ID of a current game sequence interval; and
performing the game calculation process based on data included in the packet when the interval ID included in the packet coincides with the interval ID of the current game sequence interval.

16. The game device as defined in claim 15, wherein the interval ID is identification information that specifies the game sequence interval.

17. The game device as defined in claim 15, wherein each game sequence interval is linked to an interval ID.

18. The game device as defined in claim 15, wherein
the game sequence interval is an interval in which the game sequence process is performed, and
the game sequence process performed in each of the plurality of game sequence intervals includes at least one of (1) a character selection process that selects a character that appears in a game, (2) a data load process that loads data necessary for the game, (3) a character battle process, (4) a game result display process, (5) a lobby process for a player to participate in an online game, (6) an opening screen display process of the game, (7) an ending screen display process of the game, and (8) a demonstration screen display process of the game.

19. The method according to claim 15, further comprising:
providing a packet buffer that stores the packet received from the other game device, the packet processing section writing the packet into the packet buffer when the interval ID included in the packet coincides with the interval ID of the current game sequence interval, and
performing the game calculation process based on data included in the packet that has been written into the packet buffer.

20. A computer program product storing a program code that causes a computer to execute steps comprising:
processing a packet that is transferred between the game device and another game device via a network;
performing a game calculation process based on data transferred by the packet, the game calculation process performing a game sequence process in each of a plurality of game sequence intervals; and
generating an image based on a result of the game calculation process,
the packet transferred between the game device and the other game device including an interval ID that specifies a game sequence interval in which data transferred by the packet is used,
the method further comprising:
comparing the interval ID included in the received packet with the interval ID of a current game sequence interval; and
performing the game calculation process based on data included in the packet when the interval ID included in the packet coincides with the interval ID of the current game sequence interval.

* * * * *